US012559581B2

(12) United States Patent
Bernardo et al.

(10) Patent No.: US 12,559,581 B2
(45) Date of Patent: Feb. 24, 2026

(54) ETHYLENE-COPOLYMERS AND CATALYST MIXTURE FOR MAKING ETHYLENE COPOLYMERS

(71) Applicant: ARLANXEO NETHERLANDS B.V., Geleen (NL)

(72) Inventors: Raffaele Bernardo, Maastricht (NL); Gerardus Van Doremaele, Munstergeleen (NL); Wouter Van Meerendonk, Einighausen (NL); Peter Windmuller, Landgraaf (NL)

(73) Assignee: ARLANXEO NETHERLANDS B.V., Geleen (NL)

( * ) Notice: Subject to any disclaimer, the term of this patent is extended or adjusted under 35 U.S.C. 154(b) by 787 days.

(21) Appl. No.: 17/796,539

(22) PCT Filed: Mar. 15, 2021

(86) PCT No.: PCT/EP2021/056489
§ 371 (c)(1),
(2) Date: Jul. 29, 2022

(87) PCT Pub. No.: WO2021/185737
PCT Pub. Date: Sep. 23, 2021

(65) Prior Publication Data

US 2023/0331884 A1 Oct. 19, 2023

(30) Foreign Application Priority Data

Mar. 16, 2020 (EP) .................................... 20163397
Mar. 17, 2020 (EP) .................................... 20163685

(51) Int. Cl.
*C08F 210/18* (2006.01)
*C08F 4/6592* (2006.01)

(52) U.S. Cl.
CPC ........ *C08F 210/18* (2013.01); *C08F 2420/04* (2013.01); *C08F 2500/05* (2013.01)

(58) Field of Classification Search
None
See application file for complete search history.

(56) References Cited

U.S. PATENT DOCUMENTS

| | | | |
|---|---|---|---|
| 5,914,372 | A | 6/1999 | Hasegawa et al. |
| 7,943,711 | B2 | 5/2011 | Ravishankar |
| 7,956,140 | B2 | 6/2011 | Ijpeij et al. |
| 8,957,170 | B2 | 2/2015 | Van Doremaele et al. |
| 2008/0287620 | A1 | 11/2008 | Ravishankar |
| 2009/0012246 | A1 | 1/2009 | Ijpeij et al. |
| 2009/0209672 | A1 | 8/2009 | Ebata et al. |
| 2016/0122370 | A1 * | 5/2016 | Berthoud .............. C07C 257/18 502/103 |

FOREIGN PATENT DOCUMENTS

| | | | |
|---|---|---|---|
| CN | 1 934 145 | A | 3/2007 |
| EP | 10 88 836 | A | 4/2001 |
| JP | H-0971616 | A | 3/1997 |
| JP | H10 204228 | A | 8/1998 |
| JP | H11-236413 | A | 8/1999 |
| JP | H11 286568 | A | 10/1999 |
| JP | 2007-529584 | A | 10/2007 |
| JP | 2010-527398 | A | 8/2010 |
| JP | 2013-515121 | A | 5/2013 |
| WO | 99/00434 | A1 | 1/1999 |
| WO | 2005/090418 | A1 | 9/2005 |
| WO | 2009072503 | A1 | 6/2009 |
| WO | 2016/114914 | A1 | 7/2016 |
| WO | 2019/129502 | A1 | 7/2019 |

OTHER PUBLICATIONS

Bochmann et al., "Synthesis of Base-Free Cationic Zirconium Methyl and Benzyl Complexes. The Crystal and Molecular Structure of {C5H3(SiMe3)2-1,3}2ZrMe(u-Me) B )C6F5)3", Organometallics, vol. 13, No. 6, p. 2235-2243 1994.
Scholte et al., "Mark-Houwink Equation and GPC Calibration for Linear Short-Chain Branched Polyolefins, Including Polyproylene and Ethylene-Propylene Copolymers", J. of Appl. Pol. Sci., vol. 29, 3763-3782 (1984).
Wolfgang et al., "The First of an Ethylene-Selective Soluble Ziegler Catalyst of the Zirconocene Class", Angew. Chem. Int. Ed. Engl. 28, No. 11 (1989).
International Search Report dated Aug. 19, 2021, in connection with PCT International Application No. PCT/EP2021/056489.
Written Opinion issued in connection with PCT International Application No. PCT/EP2021/056489.

* cited by examiner

*Primary Examiner* — Fred M Teskin
(74) *Attorney, Agent, or Firm* — Norris McLaughlin, PA

(57) ABSTRACT

A copolymer comprising repeating units derived from ethylene, at least one $C_3$-$C_{20}$-α-olefin, at least one non-conjugated diene, and at least one dual polymerizable diene, wherein the copolymer has
(i) an intensity ratio D of ≤0.5 and
(ii) a molecular weight distribution (MWD)≥R, wherein R depends on the branching index g'(III) of the copolymer and
wherein R is −27.7 times g'(III)+29.2, when g'(III) is ≤0.90; and R is 4.3 when g'(III) is >0.90 and up to 0.99.
Also provided is a catalyst composition for making such copolymers containing at least two different metal complexes, a process for making the catalyst composition, a process for making the copolymer and to articles obtained with the copolymer.

16 Claims, 2 Drawing Sheets a)

b)

c)

d)

e)

f)

ETHYLENE-COPOLYMERS AND CATALYST MIXTURE FOR MAKING ETHYLENE COPOLYMERS

This application is a 371 of PCT/EP2021/056489, filed Mar. 15, 2021, which claims foreign priority benefit under 35 U.S.C. § 119 of the European Patent Application Nos. 20163397.1 and 20163685.9, filed Mar. 16 and 17, 2020, respectively, their disclosures of which are incorporated herein by reference.

The present disclosure relates to an elastomeric ethylene-copolymer having improved extrusion properties. The present disclosure further relates to a catalyst mixture and a polymerization process for making the copolymer. The present disclosure also relates to extruded articles made with the copolymer.

BACKGROUND

Elastomeric ethylene-copolymers are generally processed in the form of compounds, i.e. the copolymers are mixed with one or more fillers and other optional ingredients to form a so-called compound. Frequently, ethylene-copolymers that result in desired good mechanical properties, like for example high tensile strength and low compression sets, lead to compounds that are difficult or expensive to process because high forces have to be applied for processing them.

One approach to overcome this problem has focused on attempts to reduce the viscosity of the compound by adding various ingredients to the compounds. Instead of using a single copolymer, blends of copolymers of different Mooney viscosity have been used to reduce the viscosity of the compounds, for example by adding one or more copolymers of lower Mooney viscosity. This approach includes blending the polymers after they had been prepared or blending them during the polymerization to provide so-called “in-situ blends” or, “reactor blends”. Other methods include the addition of oils, either to the compounds as lubricating agents (“processing oils”) or as “extender oils” to provide “oil-extended” ethylene-copolymers. Extender oils are incorporated into the polymer structure, for example by adding the extender oil to the polymer during the production process prior to isolating the polymer. While these approaches can lead to a reduction of the compound viscosity, they generally may come at the cost of reducing the mechanical performance of the compound.

Another approach has focused on developing new catalysts for making ethylene-copolymers to replace the conventionally used Ziegler-Natta catalysts. This new generation of catalysts is based on molecular metal organic complexes like metallocene complexes or post-metallocene complexes and allows for a better control of the polymer structure during the polymerization, and in particular the branching pattern and microstructure of the polymer. Different metallocene catalysts can create different polymer structures and have different polymerization activities for the monomers used in making ethylene-copolymers. Metallocene-based catalysts show different activities with respect to the incorporation of comonomers into the ethylene polymer backbone. Metallocene catalysts that are reported to be highly active for the incorporation of non-conjugated dienes are described in WO2005/090418 A1. While it has been found that ethylene copolymers can be prepared with these types of catalysts that show good mechanical properties there is still a need to provide ethylene-copolymers that can provide compounds having not only good mechanical properties such as tensile strength compression sets; but that also have an improved extrusion behavior. Favorably, the such polymers can be produced at low costs.

SUMMARY

The inventors have found that polymers of a specific monomer-composition and polymer structure possess not only good mechanical properties but can also be processed by extrusion without showing surface defects. Such polymers have a controlled structure, and a defined level of branching depending on their molecular weight distribution. The polymers comprise units derived from ethylene, at least one $C_3$-$C_{20}$-α-olefin, at least one non-conjugated diene and at least one dual polymerizable diene and are obtainable by polymerization of the monomers in the presence of a first transition metal catalyst and a second metal catalyst, and, optionally in the presence of one or more activators and, optionally, in the presence of one or more scavengers.

Therefore, in one aspect there is provided a copolymer comprising repeating units derived from (a) ethylene, (b) at least one $C_3$-$C_{20}$ α-olefin, (c) at least one dual polymerizable diene, (d) at least one non-conjugated diene with 6 to 30 carbon atoms other than the dual polymerizable diene and, wherein the copolymer has (i) an intensity ratio D of 0.5 as determined by $C^{13}$-NMR spectrometry, (ii) a branching index δΔ of from 5 to 50, wherein δΔ is the difference between the phase angle δ measured at a frequency of 0.1 rad/s and the phase angle δ measured at a frequency of 100 rad/s by dynamic mechanical analysis (DMA) at 125° C.;

(iii) a branching index g'(III) between 0.50 and 0.99 and (iv) a molecular weight distribution (MWD) z R and R depends on the branching index g'(III) of the copolymer, wherein R is −27.7 times g'(III)+29.2 when g'(III) is 0.90; and wherein R is 4.3 when g'(III) is >0.90 and up to 0.99.

wherein g'(III) and the molecular weight distribution are determined by gel permeation size exclusion chromatography, and wherein the copolymer comprises from 30 wt. % and up to 85 wt. % of units derived from ethylene, from 5 to 80 wt. % of units derived from $C_3$-$C_{20}$ α-olefin and from 2 wt. % to 20 wt. % of units derived from non-conjugated diene other than the dual polymerizable diene wherein the wt. % are based on the total weight of the polymer which is 100 wt. %, and wherein the at least one dual polymerizable diene is selected from the group consisting of 1,4-divinylcyclohexane, 1,3-divinylcyclohexane, 1,3-divinylcyclopentane, 1,5-divinylcyclooctane, 1-allyl-4-vinylcyclohexane, 1,4 diallyl cyclohexane, 1-allyl-5-vinylcyclooctane, 1,5-diallylcyclooctane, 1-allyl-4-isopropenyl-cyclohexane, 1-isopropenyl-4-vinylcyclohexane and 1-isopropenyl-3-vinylcyclopentane, dicyclopentadiene, 1,4-cyclohexadiene, 5-vinyl-2-norbornene (VNB), 2,5-norbornadiene, and combinations thereof.

In another aspect there is provided a process for making the copolymers comprising copolymerizing ethylene, the at least one $C_3$-$C_{20}$-α-olefin, the at least one non-conjugated diene and the at least one dual polymerizable diene monomer in the presence of at least one first metal complex wherein the first and second metal complex wherein the first metal complex corresponds to formula (1)

$$CyLMZ_p \quad (1),$$

wherein

Cy is a cyclopentadienyl ligand which may contain one or more substituents preferably selected from the group consisting of halogens and aromatic or aliphatic, linear or branched or cyclic residues comprising from 1 to 20 carbon atoms;

M is selected from titanium, hafnium or zirconium;

Z is an anionic ligand selected from the group consisting of halogens, $C_{1-10}$ alkyl groups, $C_{7-20}$ aralkyl groups, $C_{6-20}$ aryl groups, $C_{1-20}$ hydrocarbon-substituted amino groups and combinations thereof;

p is 1 or 2, preferably 2, and

L is a ligand according to formula (2)

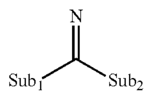

(2)

wherein the ligand L is covalently bonded to the metal M via its imine nitrogen atom, $Sub_1$ is a $C_1$-$C_{20}$ alkyl residue or a $C_6$-$C_{20}$ aryl residue, which may be unsubstituted or substituted with substituents selected from halogens and $C_1$-$C_3$ alkyl groups; $Sub_2$ represents the general formula —$NR^4R^5$ with $R^4$ and $R^5$ being independently selected from the group consisting of aliphatic $C_1$-$C_{20}$ hydrocarbyl, halogenated $C_1$-$C_{20}$ aliphatic hydrocarbyl, aromatic $C_6$-$C_{20}$ hydrocarbyl and halogenated aromatic $C_5$-$C_{20}$ hydrocarbyl residues or $R^4$ forming a heterocyclic ring with $R^5$ or with $Sub_1$, or L corresponds to the general formula (2b)

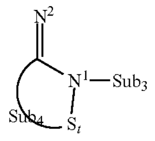

(2b)

wherein the amidine-containing ligand is covalently bonded to the metal M via the imine nitrogen atom $N^2$; S is a —$CH_2$— unit, and t is an integer and represents 1, 2, 3 and 4, $Sub_3$ represents an aliphatic or aromatic, cyclic or linear substituent comprising a group 14 atom through which $Sub_3$ is bonded to the amine nitrogen atom $N^1$, $Sub_4$ is a $C_2$ unit in which the 2 carbon atoms may be $sp^2$ or $sp^3$ hybridized and wherein the $C_2$ unit may be substituted, for example. by one or more halogen atoms, or by one or more $C_1$-$C_{10}$ alkyl groups or $C_1$-$C_{10}$ alkoxy groups;

and wherein the second metal complex is a bis-indenyl complex and corresponds to the formula (3)

$$J\text{-}Ind_2\text{-}MX_2 \quad (3);$$

wherein $Ind_2$ represents two indenyl ligands to which the metal M is bonded and that are further linked to each other via the bonding group J; the indenyl ligands can be substituted or unsubstituted and preferably are unsubstituted;

J represents a divalent bridging group linking the two indenyl ligands ($In_2$); wherein J is selected from (a) cyclic units $(R^a{}_2J')_n$ where each J' is independently C or Si (with J' preferably being Si), n is 1 or 2, and each $R^a$ is, independently, a $C_1$ to $C_{20}$ substituted or unsubstituted hydrocarbyl, provided that two or more $R^a$ are joined together to form a saturated or partially saturated or aromatic cyclic or fused ring structure that incorporates at least one J' and (b) non-cyclic units $R^b{}_2J'$ wherein each $R^b$ is independently selected from hydrogen, $C_1$-$C_9$ linear or branched hydrocarbyl which may be unsubstituted or substituted and where each J' is independently C or Si with J' preferably being Si;

M is selected from titanium, hafnium or zirconium;

each X is independently a univalent anionic ligand, selected from the group consisting of halogens, $C_{1-10}$ alkyl groups, $C_{7-20}$ aralkyl groups, $C_{6-20}$ aryl groups and $C_{1-20}$ hydrocarbon-substituted amino groups.

In another aspect there is provided an extruded article comprising the copolymer wherein the copolymer is at least partially cured.

In another aspect there is proved a process of making the extruded article comprising providing a compound comprising the copolymer, preferably in at least partially cured form, and extruding the compound through at least one die.

In yet another aspect there is provided comprising a composition comprising the first and the second metal complex.

The copolymers, the catalysts and the methods of making the copolymers, the catalysts and the applications of the copolymers will now be described in greater detail.

FIGURES

DETAILED DESCRIPTION

Figure 1:
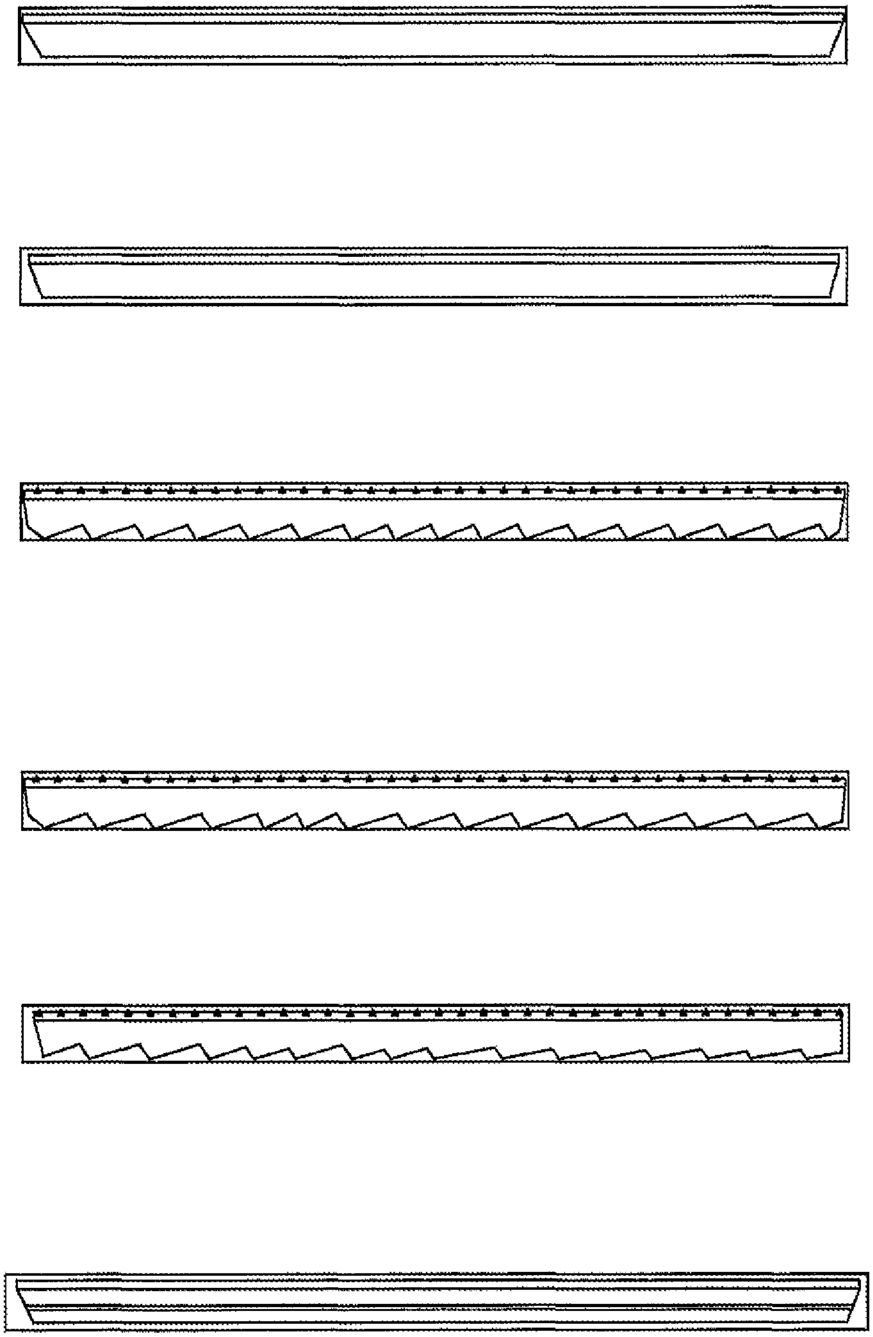
FIG. 1 is a photograph of the extruded strips of copolymer compounds obtained in the extrusion experiments.

In the following descriptions norms may be used. If not indicated otherwise, the norms are used in the version that was in force on Mar. 1, 2020. If no version was in force at that date because, for example, the norm has expired, then the version is referred to that was in force at a date that is closest to Mar. 1, 2020.

In the following description the amounts of ingredients of a composition or polymer may be indicated by "weight percents", "wt. %" or "% by weight". The terms "weight percents", "wt. %" or "% by weight" are used interchangeably and are based on the total weight of the composition or polymer, respectively, which is 100%. This means the total amount of various ingredients of a composition or a polymer adds up 100% by weight.

The copolymer according to the present disclosure is a copolymer of ethylene and at least three further comonomers. This means the copolymer comprises repeating units derived from ethylene and the at least three further comonomers. Preferably, the copolymer comprises at least 30 percent by weight (wt. %) and up to 85 wt. % of units derived from ethylene. More preferably, the copolymer according to the present disclosure comprises from 41 to 80 wt. %, most preferably from 45 to 74 wt. % of units derived from ethylene. The weight percentages are based on the total weight of the copolymer.

In addition to units derived from ethylene, the copolymer according to the present disclosure has repeating units derived from (i) one or more $C_3$-$C_{20}$-α-olefin, preferably a $C_3$-$C_{12}$-α-olefin, (ii) at least one non-conjugated diene, and (iii) at least one dual polymerizable diene.

$C_3$-$C_{20}$-α-Olefins $C_3$-$C_{20}$-α-olefins (also referred to herein as "$C_3$-$C_{20}$ alpha olefins") are olefins containing three to twenty carbon atoms and having a single aliphatic carbon-carbon double bond. The double bond is located at the terminal front end (alpha-position) of the olefin. The α-olefins can be aromatic or aliphatic, linear, branched or cyclic. Examples include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-hepta-decene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. The alpha olefins may be used in combination. Preferred alpha-olefins are aliphatic $C_3$-$C_{12}$ α-olefins, more preferably aliphatic, linear $C_3$-$C_4$ α-olefins, most preferably propylene (a $C_3$ α-olefin) and 1-butene ($C_4$ α-olefin). Propylene is the most preferred.

Preferably, the copolymer contains up to 80 wt. %, more preferably up to 50 wt. % of units derived from the $C_3$-$C_{20}$ α-olefins (all weight percentages (wt. %) are based on the total weight of the copolymer). Preferably the copolymer contains from 5 to 80 wt. % of total units derived from $C_3$-$C_{20}$ α-olefins, more preferably from 15 to 45 wt. % or from 25 to 45 wt. % of total units derived from $C_3$-$C_{20}$ α-olefins. Preferably the copolymer contains from 5 to 80% by weight, more preferably from 15 to 45% by weight and most preferably from 25 to 45% by weight of units derived from propylene (all weight percentages (wt. %) based on the total amount of copolymer).

Non-Conjugated Dienes

Non-conjugated dienes are polyenes comprising at least two double bonds, the double bonds being non-conjugated in chains, rings, ring systems or combinations thereof. The polyenes may have endocyclic and/or exocyclic double bonds and may have no, the same or different types of substituents. The double bonds are at least separated by two carbon atoms. To a significant extent only one of the non-conjugated double bonds is converted by a polymerization catalyst. Therefore, the non-conjugated dienes can provide cure sites in the polymer.

The non-conjugated dienes are preferably aliphatic, more preferably alicyclic and aliphatic.

Suitable non-conjugated dienes include aromatic polyenes, aliphatic polyenes and alicyclic polyenes, preferably polyenes with 6 to 30 carbon atoms ($C_6$-$C_{30}$-polyenes, more preferably $C_6$-$C_{30}$-dienes). Specific examples of non-conjugated dienes include 1,4-hexadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiehe, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 1,5,9-decatriene, 6-methyl-1,6-undecadiene, 9-methyl-1,8-undecadiene, dicyclopentadiene, and mixtures thereof. Dicyclopentadiene can be used both as dual polymerizable or as non-conjugated diene, in which case dicyclopentadiene is used in combination with at least one dual polymerizable diene or at least one non-conjugated diene.

Preferred non-conjugated dienes include alicyclic polyenes. Alicyclic dienes have at least one cyclic unit. In a preferred embodiment the non-conjugated dienes are selected from polyenes having at least one endocyclic double bond and optionally at least one exocyclic double bond. Preferred examples include dicyclopentadiene, 5-methylene-2-norbornene and 5-ethylidene-2-norbornene (ENB) with ENB being particularly preferred.

Examples of aromatic non-conjugated polyenes include vinylbenzene (including its isomers) and vinyl-isopropenylbenzene (including its isomers).

In a typical embodiment of the present disclosure the copolymer contains up to and including 20 wt. % of units derived from the one or more non-conjugated diene. In a preferred embodiment, the copolymer contains from 2 to 12 wt. % of units derived from the one or more non-conjugated dienes. In a preferred embodiment the copolymer contains up to 20% wt. % of units from ENB, and, more preferably from 2 to 12 wt. % of units derived from ENB, or from 3.5 to 6.7 wt. % of units derived from ENB (all wt. % based on the total weight of the copolymer).

Dual Polymerizable Dienes

Dual polymerizable dienes are selected from vinyl substituted aliphatic monocyclic and non-conjugated dienes, vinyl substituted bicyclic and unconjugated aliphatic dienes, alpha-omega linear dienes and non-conjugated dienes where both sites of unsaturation are polymerizable by a coordination catalyst (e.g. a Ziegler-Natta Vanadium catalyst or a metallocene-type catalyst). Therefore, the dual polymerizable monomers can create polymer branches during the polymerization. Examples of dual polymerizable dienes include 1,4-divinylcyclohexane, 1,3-divinylcyclohexane, 1,3-divinylcyclopentane, 1,5-divinylcyclooctane, 1-allyl-4-vinylcyclo-hexane, 1,4 diallyl cyclohexane, 1-allyl-5-vinylcyclooctane, 1,5-diallylcyclooctane, 1-allyl-4-isopropenylcyclohexane, 1-isopropenyl-4-vinylcyclohexane and 1-isopropenyl-3-vinylcyclopentane, dicyclopentadiene and 1,4-cyclohexadiene. Preferred are non-conjugated vinyl norbornenes and $C_5$-$C_{12}$ alpha omega linear dienes. (e.g., 1,7-octadiene, 1,8-nonadiene, 1,9-decadiene, 1,10 undecadiene, 1,11 dodecadiene). The dual polymerizable dienes may be further substituted with at least one group comprising a heteroatom of group 13-17 for example O, S, N, P, Cl, F, I, Br, or combinations thereof.

In a preferred embodiment of the present disclosure the dual polymerisable diene is selected from, 2,5-norbornene, 5-vinyl-2-norbornene (VNB), 1,7-octadiene and 1,9-decadiene with 5-vinyl-2-norbornene (VNB) being most preferred.

Preferably, the copolymer of the present disclosure contains from 0.05 wt. % to 5 wt. %, more preferably from 0.10 wt. % to 3 wt. % or from 0.2 wt. % to 1.2 wt. % or from at least 0.5 up to 5% wt or up to 3 wt. % or up to 1.2 wt. % of units derived from the one or more dual polymerizable diene, more preferably from VNB (all weight percentages are based on the total weight of copolymer).

In a preferred embodiment, the copolymer of the present disclosure contains units derived from 5-ethylidene-2-norbornene and 5-vinylnorbornene. In a more preferred embodiment the copolymer contains units derived from ethylene, propylene, 5-ethylidene-2-norbornene and 5-vinyl-2-norbornene.

Intensity Ratio

The intensity ratio (abbreviated herein as "D") is a measure for the microstructure of the polymer, more particular, for the region-regularity of the incorporation of the $C_3$-$C_{20}$ alpha olefins into the polymer backbone and is described, for example, in European patent application EP 10 88 836 A1 to Koda and Kawasaki incorporated herein by reference. The intensity ratio expresses the ratio of $CH_2$-units from the $C_3$-$C_{20}$ alpha-olefins in different position with respect to a tertiary carbon atom in the polymer backbone. This demonstrated for the different arrangements of $CH_2$-units from propylene below:

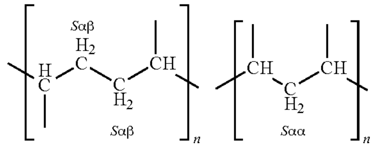

A $CH_2$-unit can be in direct vicinity of two tertiary carbon atoms (herein referred to as "Sαα") or in direct vicinity one a secondary and one tertiary carbon atom (herein referred to as "Sαβ").

In a $^{13}$C-NMR spectrum these (Sαα) and (Sαβ) carbon units give signals at different positions in the spectrum. Thus, one signal (Sαα) is that of a CH2 being in direct vicinity of two tertiary carbon atoms and the other signal (Sαβ) is that of a CH2 being in direct vicinity of one tertiary carbon atom and one secondary carbon atom. The ratio of the intensity of the signals for the carbon atoms Sαβ over the intensity of the signal for the carbon atoms Sαα gives intensity ratio D. The higher the value for D, the more regio-irregular is the orientation of the linkage of the α-olefin and the higher is the 2,1 incorporation of the α-olefin within the polymer chain. The lower the value for D, the more regio-regular is the linkage orientation of the α-olefin and the lower is the 2,1 incorporation of the α-olefin within the polymer chain.

Ethylene-copolymers obtained with Ziegler-Natta catalysts (i.e. with non-metallocene type catalysts based on halides of transition metals, in particular vanadium) are believed to have an intensity ratio D of greater than 0.5. Therefore, an intensity ratio D of 0.5 or less means that the polymer is obtained without using a Ziegler-Natta catalyst, but is obtained, for example, by a metallocene-type catalyst. "Metallocene-type catalysts" as used herein refers to catalysts organometallic catalysts wherein the metal is bonded to at least one cyclic ligand, preferably at least one cylcopentadienyl or at least one indenyl ligand.

The ethylene-copolymers according to the present disclosure are not obtained by using a Zeigler-Natta catalyst because they have an intensity ratio D of 0.5 or less. The ethylene-copolymers according to the present disclosure are obtainable by a combination of a first and second metal complex, wherein both the second and the first catalysts are metallocene-type catalysts like, for example the first and second catalysts described herein. Typically, the ethylene-copolymer according to the present disclosure has an intensity ratio 0.5 or less, for example from 0.01 up to and including 0.4 or from 0.03 up to 0.3, or from 0.05 up to 0.02, or from greater than 0.06 and up to 0.4.

Molecular Weight Distribution (MWD) and q'(III)

The molecular weight distribution (MWD) is the ratio of the weight average molar mass (Mw) to the number average molar mass of the copolymer, i.e. MWD=Mw/Mn. The MWD can be determined by gel permeation size exclusion chromatography (GPC-SEC).

It has been found that good extrusion properties, in particular extrusion without or with reduced surface effects can be achieved by polymers that have a certain relationship between their MWD and degree of branching. The copolymers according to the present disclosure have a molecular weight distribution (MWD) which also depends on their level of branching. The MWD of the polymer according to the present disclosure is equal or greater than the value of R. The value of R depends on the value of g'(III). g'(III) is a branching index and indicates the degree of branching in the polymer structure as described in international patent application WO 99/00434 A1 to Evens et al, incorporated herein by reference including the references cited therein.

Therefore, the molecular weight distribution of the polymers according to the present disclosure depends on the degree of branching in the polymer structure as determined by the parameter g'(II). The parameter g'(IIII) is an indication of the branching of the polymer based on its hydrodynamic radius. The greater the degree of branching of the lower is g'(III). In case g'(III) is ≤0.90, R is determined by multiplying the value of g'(III) with (−27.7) and adding 29.2 to the result, i.e. R is −27.7 times g'(III)+29.2. When g'(III) is greater than 0.90 and up to 0.99 then R is 4.3.

g'(III) is determined according to the equation: $g'(III)=([\eta]/[\eta]^*)^{1+\alpha}$, wherein [η] is the measured weight-average (or bulk) intrinsic viscosity of the ethylene copolymer in dl/g; and [η]* is the apparent weight-average (or bulk) intrinsic viscosity of a linear copolymer of the same ethylene-α-olefin composition in dL/g.

α is the Mark Houwink exponent. For a linear polymer in an ideal solvent a is 0.725. For the determination of g'(III) as used herein 1+a is 1.725.

In one embodiment, the copolymer of the present disclosure has a degree of branching corresponding to a g'(III) of from about 0.50 to 0.99. In another embodiment of the present disclosure the copolymer has a degree of branching corresponding to a g'(III) of from 0.70 to 0.98. In another embodiment the copolymer according to the present disclosure has a degree of branching corresponding to a g'(III) of from 0.75 to 0.95, or from 0.80 to 0.97.

In another embodiment, the copolymer of the present disclosure has, alternatively or additionally, an MWD greater than 4.1. In one embodiment the copolymer of the present disclosure has an MWD of from 4.2 to 120, or from 4.2 to 50 or from 4.2 to 10. In one embodiment the copolymer of the present disclosure has an MWD of at least 4.2 or at least 4.5, for example from 4.0 to 9.5.

The copolymer according to the present disclosure has a Mooney viscosity from 20 Mooney units (MU) at ML 1+4 at 100° C. to 120 MU at ML 1+8 at 150° C. In one embodiment the copolymer according to the present disclosure has a Mooney viscosity from 56 to 120 at ML 1+8 at 150° C. In one embodiment the copolymer according to the present disclosure has a Mooney viscosity of 20 to 90 at ML 1+4 at 125° C. or a Mooney viscosity of 20 to 90 at ML 1+4 at 100° C.

The ethylene-α-olefin-copolymer according to the present disclosure preferably has a weight average molecular weight (Mw) of at least 40,000 g/mol, in particular from 40,000 to 800,000 g/mol.

Preferably, the ethylene-α-olefin-copolymer according to the present disclosure is branched with a Δδ between 2 and 50, more preferably with a Δδ between 5 and 35 or between 10 to 30. Δδ, expressed in degrees, is the difference between the phase angle δ at a frequency of 0.1 rad/s and the phase angle δ at a frequency of 100 rad/s, as determined by Dynamic Mechanical Spectroscopy (DMS) at 125° C. Therefore, the branching parameter Δδ is an indication of the branching of the polymer in the molten or fluid state.

Catalysts

The copolymers according to the present disclosure can be obtained by polymerizing the monomers in the presence of a first metal complex and a second metal complex. Preferably, the metal complexes are used in combination. However, the polymerization with the metal complexes may also be carried out sequentially, for example by polymerizing first in the presence of the first metal catalyst and subsequently in the presence of the second metal complex or by polymerizing in the presence of the first metal complex and separately polymerizing in the presence of the second metal complex and subsequently combining the separate reaction mixtures, for example to provide a reactor blend.

First Metal Complex

The first metal complex comprises a metallocene catalyst and corresponds to formula (1)

$$CyLMZ_p \qquad (1),$$

wherein

Cy is a cyclopentadienyl ligands comprising one or more substituents, preferably selected from the group consisting of halogens and aromatic or aliphatic, linear or branched or cyclic residues comprising from 1 to 20 carbon atoms;

M is a group 4 metal,

Z is an anionic ligand, p is 1 or 2, preferably 2, and

L is a ligand according to formula (2):

(2)

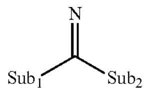

The ligand L is covalently bonded to the metal M via its imine nitrogen atom. $Sub_1$ of formula (2) is a substituent comprising a group 14 atom, preferably a carbon atom, through which $Sub_1$ is bonded to the imine carbon atom. $Sub_2$ of formula (2) is a substituent comprising a heteroatom of group 15, preferably a nitrogen atom, through which $Sub_2$ is bonded to the imine carbon atom. In a preferred embodiment L is an aminidate.

To illustrate the chemical structure of the first metal complex the following metal complex is identified by its chemical structure in formula (2a) wherein: Cy is a pentamethyl cyclopentadienyl ligand, M is titanium, p is 2, Z are both methyl (Me) and L is according to formula (2).

(2a)

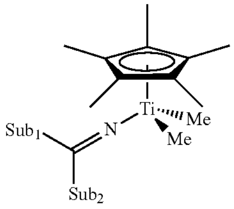

Preferred Embodiments for the First Metal Complex (Catalyst A)

M:

In a preferred embodiment, M of formula (1) represents titanium (Ti), zirconium (Zr) or hafnium (Hf), more preferably titanium.

Z:

In a preferred embodiment Z is selected from the group consisting of halogen, a $C_{1-10}$ alkyl group, a $C_{7-20}$ aralkyl group, a $C_{5-20}$ aryl group or a $C_{1-20}$ hydrocarbon-substituted amino group. More preferably Z is selected from a halogen atom and a $C_{1-10}$ alkyl group. Most preferably Z is selected from the group consisting of Cl, F, Br, methyl, benzyl, methyltrimethylsilyl, phenyl, methoxyphenyl, dimethoxyphenyl, N,N-dimethylaminophenyl, bis-(N,N-dimethylamino)phenyl, fluorophenyl, difluorophenyl, trifluorophenyl, tetrafluorophenyl, perfluorophenyl, trialkylsilylphenyl, bis(trialkylsilyl)phenyl and tris(trialkylsilyl)phenyl. Most preferably Z is methyl or benzyl. In case p is 2 Z can be the same or can be selected from a combination of the above residues. In a preferred embodiment, p is 2 and both residues Z are identical and preferably both are methyl.

L:

In a preferred embodiment $Sub_1$ of formula (2) is selected from a substituted or unsubstituted $C_6$-$C_{20}$ aryl residue or a substituted or unsubstituted $C_1$-$C_{20}$ alkyl residue. Preferably $Sub_1$ is selected from a substituted or unsubstituted $C_5$-$C_{20}$ aryl residue Preferably, $Sub_1$ is selected from phenyl, phenyl having at least one, preferably two substituents selected from halogens and alkyl, preferably methyl groups. Preferably $Sub_1$ is selected from 2,6-dimethylphenyl, 2,6-dichlorophenyl or 2,6-difluorophenyl. In another embodiment of the present disclosure $Sub_1$ of formula (2) represents a $C_1$-$C_{20}$ alkyl residue. Typical examples of such alkyl residues include linear, branched or cyclic alkyl residues with 1 to 20 carbon atoms. These alkyl residues may be unsubstituted or they may be substituted with substituents selected from the group consisting of halogen, amido, silyl or $C_6$-$C_{20}$ aryl radicals and combinations thereof. In a preferred embodiment $Sub_1$ represents methyl, hexyl, cyclohexyl, isopropyl, tert-butyl, benzyl, trifluoromethyl, 2,6-dimethyl benzyl, 2,6-difluoro benzyl or 2,6-difluoro benzyl.

In a preferred embodiment $Sub_2$ of formula (2) represents the general formula —$NR^4R^5$ with $R^4$ and $R^5$ being independently selected from the group consisting of aliphatic $C_1$-$C_{20}$ hydrocarbyl, halogenated $C_1$-$C_{20}$ aliphatic hydrocarbyl, aromatic $C_5$-$C_{20}$ hydrocarbyl and halogenated aromatic $C_5$-$C_{20}$ hydrocarbyl residues or $R^4$ optionally forming a heterocyclic ring with $R^5$ or $Sub_1$. In one embodiment $Sub_2$ is an aliphatic and linear residue. Preferred examples of $Sub_2$ include but are not limited to dialkylamide, preferably dimethylamide, diethylamide, diisopropylamide, or piperidinyl.

Specific examples of L include, but are not limited to, N,N-dimethylacetimidamidinate, N,N-diisopropylacetimidamidinate diisopropylacetimidamidinate, N,N-dicyclohexylacetimidamidinate, N-(2,6-dimethylphenyl)-N-ethylacetimidamidinate, N,N-dimethylisobutyrimidamidinate, N,N-diisopropylisobutyrimidamidinate, N,N-dicyclohexylisobutyrimidamidinate, N-(2,6-dimethylphenyl)-N-ethylisobutyrimidamidinate, N,N-dimethylcyclohexanecarboximidamidinate, N,N-diisopropylcyclohexanecarboximidamidinate, N,N-dicyclohexylcyclohexanecarboximidamidinate, N-(2,6-dimethylphenyl)-N-ethylcyclohexanecarboximidamidinate, N,N-dimethylpivalimidamidinate, N,N-diisopropylpivalimidamidinate, N,N-dicyclohexylpivalimidamidinate, N-(2,6-dimethylphenyl)-N-ethylpivalimidamidinate, 2,2,2-trifluoro-N,N-dimethylacetimidamidinate, 2,2,2-trifluoro-N,N-diisopropylacetimidamidinate, N,N-dicyclohexyl-2,2,2-trifluoroacetimidamidinate, N-(2,6-dimethylphenyl)-N-ethyl-2,2,2-trifluoroacetimidamidinate, 2-(phenyl)-N,N-dimethylacetimidamidinate, 2-(phenyl)-N,N-diisopropylacetimidamidinate, N,N-dicyclohexyl-2-(phenyl)acetimidamidinate, 2-(phenyl)-N-(2,6-dimethylphenyl)-N-ethylacetimidamidinate, 2-(2,6-dimethylphenyl)-N,N-dimethylacetimidamidinate, 2-(2,6-dimethylphenyl)-N,N-diisopropylacetimidamidinate, N,N-dicyclohexyl-2-(2,6-dimethylphenyl)acetimidamidinate, N,2-bis(2,6-dimethylphenyl)-N-ethylacetimidamidinate, 2-(2,6-difluorophenyl)-N,N-dimethylacetimidamidinate, 2-(2,6-difluorophenyl)-N,N-diisopropylacetimidamidinate, N,N-dicyclohexyl-2-(2,6-difluorophenyl)acetimidamidinate, 2-(2,6-difluorophenyl)-N-(2,6-dimethylphenyl)-N-ethyl-acetimidamidinate, N,N-dimethylbenzimidamidinate, N,N-diisopropylbenzimidamidinate, N,N-dicyclohexylbenzimidamidinate, N-(2,6-dimethylphenyl)-N-ethylbenzimidamidinate, N,N-dimethyl-1-naphthimidamidinate, N,N-diisopropyl-1-naphthimidamidinate, N,N-dicyclohexyl-1-naphthimidamidinate, N-(2,6-dimethylphenyl)-N-ethyl-1-naphthimidamidinate, N,N,2,6-tetramethylbenzimidamidinate, N,N-diisopropyl-2,6-dimethylbenzimidamidinate, N,N-dicyclohexyl-2,6-dimethylbenzimidamidinate, N-(2,6-dimethylphenyl)-N-ethyl-2,6-dimethylbenz-imidamidinate, 2,6-difluoro-N,N-dimethylbenzimidamidinate, 2,6-difluoro-N,N-diisopropylbenzimidamidinate, N,N-dicyclohexyl-2,6-difluorobenzimidamidinate, N-(2,6-dimethylphenyl)-N-ethyl-2,6-difluorobenzimidamidinate, 2,6-dichloro-N,N-dimethylbenzimidamidinate, 2,6-dichloro-N,N-diisopropylbenzimidamidinate, 2,6-dichloro-N,N-dicyclohexylbenzimidamidinate, 2,6-dichloro-N-(2,6-dimethylphenyl)-N-ethylbenzimidamidinate. Preferred examples are 2,6-difluoro-N,N-piperidinylbenzamidinate, 2,4-difluoro-N,N-diisopropylbenz-imidamidinat, 2,4,6-trifluoro-N,N-diisopropylbenz-imidamidinate, 3,5-difluoro-N,N-diisopropylbenz-imidamidinate, pentafluoro-N,N-diisopropylbenz-imidamidinate, 2,6-difluoro-N,N-diisopropylbenz-imidamidinate and N,N-diisopropylbenzimidamidinate.

According to another preferred embodiment of the present disclosure L corresponds to the general formula (2b)

(2b)

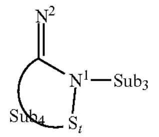

wherein the amidine-containing ligand is covalently bonded to the metal M via the imine nitrogen atom $N^2$; S is a —$CH_2$— unit, and t is an integer and represents 1, 2, 3 and 4.

Preferably t is 1 or 2, more preferably t is 1.

$Sub_3$ of formula (2b) represents an aliphatic or aromatic, cyclic or linear substituent comprising a group 14 atom through which $Sub_3$ is bonded to the amine nitrogen atom $N^1$.

In a preferred embodiment of the present disclosure $Sub_3$ is independently selected from alkyl, alkenyl and alkynyl residues with 1 to 20 carbon atoms or from aromatic residues with 6 to 20 carbon atoms. In each case the residues may be unsubstituted or substituted with halogen, amido, silyl or aryl radicals. Examples for $Sub_3$ include but are not limited to methyl, n-propyl, i-propyl, tert-butyl, pentyl, cyclopentyl, hexyl, cyclohexyl, heptyl, cycloheptyl, octyl, cyclooctyl, cyclododecyl, octadecyl, adamantyl, 1-butenyl, 2-butenyl, propenyl, unsubstituted phenyl or substituted phenyl. Preferably $Sub_3$ represents phenyl, naphthyl, 2,6-dimethylphenyl, 2,6-dichlorophenyl or 2,6-difluorophenyl.

$Sub_4$ of formula (2b) is a $C_2$ unit in which the 2 carbon atoms may be $sp^2$ or $sp^3$ hybridized. Optionally, the $C_2$ unit can be substituted, for example by one or more halogen atoms, or by one or more $C_1$-$C_{10}$ alkyl groups or $C_1$-$C_{10}$ alkoxy groups.

In another preferred embodiment of the present disclosure L corresponds to the general formula 2c)

(2c)

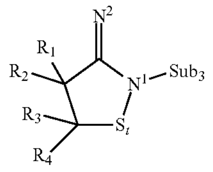

wherein $R_1$-$R_4$ are the same or different and each represents a hydrogen atom, a halogen atom, a $C_1$-$C_{10}$ alkyl group or a $C_1$-$C_{10}$ alkoxy group, wherein the alkyl group and alkoxy group may be substituted and contain one or more halogens, S, t and $Sub_3$ have the same meaning as above.

In another embodiment of the present disclosure L corresponds to the general formula 2d)

(2d)

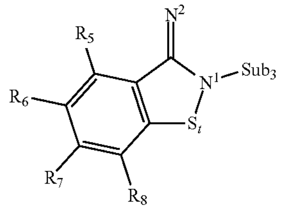

wherein $R_5$-$R_8$ are the same or different and each represents a hydrogen atom, a halogen atom, an optionally substituted $C_1$-$C_{10}$ alkyl group, an optionally substituted $C_1$-$C_{10}$ alkoxy group, or the adjacent $R_5$-$R_8$ may be linked to form an aromatic ring optionally substituted, preferably unsubstituted, and S, t and $Sub_3$ have the above mentioned meaning. Typical examples for preferred $R_5$-$R_8$ are hydrogen and fluorine.

In a preferred embodiment of the present disclosure L corresponds to the general form 2c) with $R_1$-$R_4$ each representing a hydrogen atom or L corresponds to the general formula 2d) with $R_5$-$R_8$ each representing a hydrogen atom or $R_5$ being a fluorine atom. According to this preferred embodiment $Sub_3$ is selected from methyl, n-propyl, i-propyl, tert-butyl, pentyl, cyclopentyl, hexyl, cyclohexyl, heptyl, cycloheptyl, octyl, cyclooctyl, cyclododecyl, octadecyl, adamantyl, 1-butenyl, 2-butenyl, propenyl, phenyl, naphthyl, 2,6-dimethylphenyl, 2,6-dichlorophenyl or 2,6-difluorophenyl, and t is 1.

Cy:

Cy is a substituted cyclopentadienyl ligand. The ligand may contain one—or more substituents. The five-membered carbon ring of the ligand is typically bonded to the metal via a π-type bonding usually in adopting $\eta^5$-coordination to the metal. The substituents preferably are selected from the group consisting of halogens and aromatic or aliphatic, linear or branched or cyclic residues comprising from 1 to 20 carbon atoms.

In one embodiment the cyclopentadienyl ligand may be substituted by at least one cyclic group. In one embodiment the cyclopentadienyl ligand is substituted by a cyclic substituent to form, for example, an indenyl ligand. The indenyl ligand may be substituted or not substituted, for example by substituents selected from the group consisting of halogens and aromatic or aliphatic, linear or branched or cyclic residues comprising from 1 to 20 carbon atoms.

In one embodiment the cyclopentadienyl ligand is substituted by at least one hetero-cyclic substituent, preferably an S-heterocyclic substituent and corresponds to the formula (2e):

(2e)

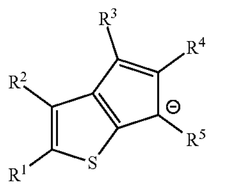

wherein $R^1$ and $R^2$ being individually selected from the group of hydrogen, halogen, $C_1$-$C_{10}$ alkyl, $C_5$-$C_{10}$ cycloalkyl, and an unsubstituted or $C_1$-$C_{10}$-alkyl or $C_1$-$C_4$-dialkyl amino substituted $C_6$-$C_{10}$ aryl, in particular $C_1$-$C_4$-alkyl substituted Phenyl or $R^1$ and $R^2$ together with the 2 double bond carbon atoms of the thiophene ring they are connected, to form an unsubstituted or $C_1$-$C_4$-alkyl substituted aliphatic $C_5$-$C_6$-cycloalkene ring, $R^3$, $R^4$ and $R^5$ being individually selected from the group of hydrogen, $C_1$-$C_4$ alkyl, unsubstituted or $C_1$-$C_4$-alkyl and/or halogen, in particular chlorine or fluorine substituted $C_6$-$C_{10}$-aryl, in particular $C_1$-$C_4$-alkyl substituted phenyl. Examples of such embodiments are disclosed in WO 2019/129502 to Berthoud et al. which is incorporated herein by reference.

In a preferred embodiment Cy is a cyclopentadienyl ligand that is substituted by at least three methyl groups. This means three of the hydrogens of the ring are replaced by methyl groups, in other words: the ligand may contain three methyl groups. Cy may additionally, or alternatively, contain substituents $R^1$ and $R^2$.

$R^1$ preferably means, halogen, in particular F, Cl and Br or an aromatic or aliphatic, linear or branched residue having from 1 to 20 carbon atoms, for example from 1 to 10 carbon atoms, or 1 to 6 carbon atoms or 1 to 3 carbon atoms. These residues may unsubstituted or substituted hydrocarbon residues. Preferably the residues are unsubstituted. Examples of unsubstituted hydrocarbon residues include, but are not limited to, methyl, ethyl, n-propyl, iso-propyl, allyl, n-butyl, iso-butyl, sec-butyl, tert-butyl, n-pentyl, 3-pentyl, sec-pentyl, tert-pentyl, heptyl, octyl, nonyl, decyl cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl or aryl radicals including phenyl, benzyl, methylphenyl, trimethylphenyl, cyclohexylphenyl, napthyl, butylphenyl, and butyldimethylphenyl.

Typical examples of substituents in substituted residues include heteroatom-containing hydrocarbon residues, halogens, in particular F, Cl and Br, and halogen-containing hydrocarbons. Heteroatom-containing hydrocarbons typically include a group 15 or a group 16 element, for example N, P, O and S. Specific examples include fluorophenyl, trifluoromethylphenyl and fluoromethyl, difluromethyl and trifluoromethyl, N,N-dimethylaminobenzyl, N,N-dimethylaminomethyl, methoxymethyl, diphenyl-phosphinomethyl, cyanoethyl and sulphur heterocycles. Preferably, $R^1$ is unsubstituted, or fluoro-substituted, more preferably, $R^1$ is methyl.

$R^2$ preferably represents a substituted or unsubstituted hydrocarbon residue containing from 1 to 20 carbon atoms, for example 1 to 10 carbon atoms, or 1 to 6 carbon atoms and preferably from 1 to 3 carbon atoms. The hydrocarbon residue includes aliphatic linear or branched hydrocarbon radicals such as methyl, ethyl, n-propyl, allyl, iso-propyl, n-butyl, iso-butyl, sec-butyl, tert-butyl, n-pentyl, 3-pentyl, sec-pentyl, tert-pentyl, heptyl, octyl, nonyl, decyl cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl. Linear or branched aromatic hydrocarbon radicals include, for example, phenyl, benzyl, methylphenyl, trimethylphenyl, cyclohexylphenyl, napthyl, butylphenyl, or butyldimethylphenyl. In one embodiment $R^2$ is methyl. The residue may be substituted. Substituents include halogens, in particular F, Cl and Br. Specific examples include fluorophenyl, trifluoromethylphenyl and fluoromethyl, difluoromethyl and trifluoromethyl. Substituents also include heteroatom-containing hydrocarbons, wherein the heteroatoms are group 15 and 16 elements such as nitrogen, phosphorous, oxygen and sulphur. Specific examples includes for heteroatom-containing substituents include but are not limited to N,N-dimethylaminobenzyl, N,N-dimethylaminomethyl, methoxymethyl, diphenylphosphinomethyl, cyanoethyl and sulphur heterocylces. Preferably, $R^2$ is not substituted.

In a preferred embodiment $R^1$ is an unsubstituted hydrocarbon residue containing from 1 to 10 carbon atoms and $R^2$ represents a methyl group. In a more preferred embodiment $R^2$ is methyl and $R^1$ is a $C_1$ to $C_6$ hydrocarbon radical or a fluorophenyl. Most preferably both, $R^1$ and $R^2$ are both methyl.

In a preferred embodiment Cy is an indenyl ligand, preferably the indenyl ligand is not substituted. In another preferred embodiment Cy is a cyclopentadienyl ligand. Preferably the cyclopentadienyl ligand is substituted and contains the residues $R^1$ and $R^2$ as described above. Preferably Cy is a cyclopentadienyl ligand containing three methyl groups in addition to the residues $R^1$ and $R^2$ as described above. In a more preferred embodiment Cy is a cyclopentadienyl ligand containing three methyl groups and $R^1$ and $R^2$ being also methyl groups.

In a preferred embodiment of the present disclosure the first metal complex corresponds to formula (1), wherein M is Ti, Z is selected from the group consisting of chlorine, preferably $C_1$-$C_4$-alkyl, and more preferably methyl, p is 2

Cy is a cyclopentadienyl or indenyl ligand, preferably cyclopentadienyl, preferably substituted with a fluorophenyl group or with four methyl groups one of which is from $R^2$ and $R^1$ is selected from hydrogen and a $C_1$-$C_3$ aliphatic group, preferably from methyl, and L is selected from the group consisting of N,N-dialkylaryl amidinates, preferably selected from N,N-diisopropylbenzamidinate, 2,6-difluoro-N,N-diisopropyl-benzamidinate, 2,6-difluoro-N,N-piperidinylbenzamidinate.

Particularly preferred examples of the first metal complex according to formula (1) include:

$((CH_3)_5Cp$-Ti—$(CH_3)_2)(NC(Ph)(NC_5H_{10})$, Ind-Ti—$(Cl_2)(NC(Ph)(NC_5H_{10}N)$, Cp-Ti—$Cl_2(NC(Ph)(iPr_2N)$, $((CH_3)_5Cp$-Ti—$(CH_3)_2)(NC(2,6$-$C_6H_3Cl_2)(N((CH(CH_3)_2)_2$, $((C_4H_9)Cp$-Ti—$(CH_3)_2)(NC(2,6$-$C_6H_3F_2)(N((CH(CH_3)_2)_2$, $((C_6F_5)Cp$-Ti—$(CH_3)_2)(NC(2,6$-$C_6H_3F_2)(N((CH(CH_3)_2)_2$, Ind-Ti—$(CH_3)_2)(NC(2,6$-$C_5H_3F_2)(N((CH(CH_3)_2)_2$, $((CH_3)_5Cp$-Ti—$(CH_3)_2)(NC(2,6$-$C_6H_3F_2)(N((CH(CH_3)_2)_2$.

In the above formulae "Cp" means cyclopentadienyl, "Ph" means phenyl, "Ind" means indenyl and "iPr" means isopropyl.

Second Metal Complex

The second metal complex includes bridged group 4 transition metal metallocene catalysts having two indenyl ligands and is also referred to herein as a "bis-indenyl metal complex". Such metal complexes are also referred to herein as bis-indenyl metallocene compounds. The two indenyl ligands may be both unsubstituted or they may be both substituted or one may be substituted and one may be substituted. Preferably, both indenyl ligands are the same.

The second metal catalyst can be represented by formula (3):

$$J\text{-}Ind_2\text{-}MX_2 \quad (3).$$

In formula (3) J represents a divalent bridging group. The bridging group links the two indenyl ligands, preferably with a C-atom or a Si-atom of the bridging group. Preferably, the bridging group is bound to a carbon atom from each of the two five-membered rings of the indenyl ligands. The bridging group may be a linear or branched hydrocarbon group or a linear or branched hydrocarbon group containing one or more heteroatoms, for example one or more Si atoms, oxygen atoms or a combination thereof.

M is a group 4 transition metal (for example, titanium, hafnium or zirconium, preferably zirconium).

Each X is independently a univalent anionic ligand, or two Xs are joined and bound to the metal atom to form a metallocycle ring, or two Xs are joined to form a chelating ligand, a diene ligand, or an alkylidene ligand. Each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof. Two Xs may form a part of a fused ring or a ring system. In particular embodiments, each X is independently selected from halides and $C_1$ to $C_5$ alkyl groups. For instance, each X may be a chloro, bromo, methyl, ethyl, propyl, butyl or pentyl group.

In a preferred embodiment each X is independently selected from the group consisting of halogens, $C_{1-10}$ alkyl, groups, $C_{7-20}$ aralkyl groups, $C_{6-20}$ aryl groups, $C_{1-20}$ hydrocarbon-substituted amino groups. In a preferred embodiment each X is a methyl group.

$Ind_2$ represents two indenyl ligands to which the metal M is bonded and that are further linked to each other via the bonding group J. The indenyl ligands can be substituted or unsubstituted and preferably are unsubstituted.

In a perspective view the second metal catalyst can be represented by formula (3'):

(3')

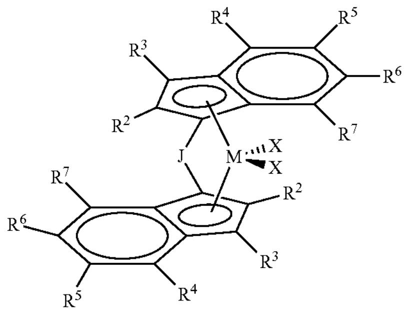

In formula (3') J, M, and X have the same meaning and preferences as described above for formula (3). Each $R^2$, $R^3$, $R^4$, $R^5$, $R^6$, and $R^7$ of the two indenyl ligands is independently selected from hydrogen, $C_1$-$C_{20}$ substituted or unsubstituted hydrocarbyl. In a preferred embodiment, each $R^2$, $R^3$, $R^4$, $R^5$, $R^6$, and $R^7$ of each indenyl ligand is hydrogen, i.e., the indenyl ligands are unsubstituted.

In one embodiment J is a cyclic unit. In such an embodiment, J is represented by the formula $(R^a{}_2J')_n$ where each J' is independently C or Si (with J' preferably being Si), n is 1 or 2, and each $R^a$ is, independently, a $C_1$ to $C_{20}$ substituted or unsubstituted hydrocarbyl, provided that two or more $R^a$ are joined together to form a saturated or partially saturated or aromatic cyclic or fused ring structure that incorporates at least one J'. Particular examples of $R^a$ include cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl. These groups may also be aromatic and include aryl radicals. Specific examples of aryl radicals include phenyl, benzyl, methylphenyl, trimethylphenyl, cyclohexylphenyl, napthyl, butylphenyl, and butyldimethylphenyl. Substituents include halogens, in particular F, Cl and Br. Specific examples of (halogen-) substituted $R^a$ groups include but are not limited to fluorophenyl, and trifluoromethylphenyl. Specific examples of heteroatom-containing substituents include, for example, N,N-dimethylaminobenzyl, diphenyl-phosphinomethyl and sulphur heterocycles.

Particular examples of J where J is silicon include cyclopentamethylenesilylene, cyclotetramethylenesilylene, cyclotrimethylenesilylene, and the like. Particular examples of J groups where J' is carbon include cyclopropandiyl, cyclobutandiyl, cyclopentandiyl, cyclohexandiyl, and the like. Such metal complexes with cyclic bridging groups are described, for example, in WO 2016/114914 A1 where they are reported to produce vinyl terminated chain ends. However, as another advantage of the present disclosure the production of vinyl-terminated chain ends is not needed to produce polymers according to the present disclosure. This allows for more flexibility in the type of chain transfer agents that can be used to produce the polymers and to control the molecular weight.

In a preferred embodiment the bridging group J is a linear or branched unit but not a cyclic unit. In such an embodiment J is represented by the formula $R^b{}_2J'$ wherein each $R^b$ is independently selected from hydrogen, $C_1$-$C_9$ linear or branched hydrocarbyl which may be unsubstituted or substituted. Examples of unsubstituted $R^b$ include, but are not limited to, methyl, ethyl, n-propyl, allyl, iso-propyl, n-butyl, iso-butyl, sec-butyl, tert-butyl, n-pentyl, 3-pentyl, sec-pentyl, tert-pentyl, heptyl, octyl, nonyl, decyl. The hydrocarbyls may be substituted, for example with one or more halogens, in particular F, Cl and Br. Specific examples include but are not limited to fluoromethyl, difluromethyl, trifluoromethyl, chloromethyl, dichloromethyl, trichloromethyl and combinations thereof. Substituents also include hydrocarbon substituents containing one or more heteroatom selected from group 15 and 16 elements such as nitrogen, phosphorous, oxygen, and sulphur. Specific examples of such substituents include, for example, N,N-dimethylaminomethyl, methoxymethyl, cyanoethyl and combinations thereof.

J' is C or Si, preferably Si. More preferably J is selected from $(H_3C)_2Si$, $(H_3C_2)_2Si$, $(H_7C_3)_2Si$, $H_2C$, $H_3CHC$, $(H_3C)_2C$, $(H_5C_2)_2Si$, $(H_7C_3)_2Si$ and most preferably J is $(H_3C)_2Si$.

In a preferred embodiment, both X are selected from $C_1$-$C_{10}$ alkyl groups, more preferably both X are identical and most preferably both X are methyl. In this preferred embodiment M is selected from zirconium, and each indenyl ligand contain from 1 to 7 alkyl substituents with 1 to 3 carbon atoms and more preferably, each indenyl ligand is not substituted. In this preferred embodiment J is linear or branched but not cyclic and more preferably J is selected from $(H_3C)_2Si$, $(H_5C_2)_2Si$, $(H_7C_3)_2Si$, $H_2C$, $H_3CHC$, $(H_3C)_2C$, $(H_5C_2)_2Si$, $(H_7C_3)_2Si$ and most preferably J is $(H_3C)_2Si$.

The catalyst compounds can be in rac or meso form.

Catalyst Composition

Preferably, the first and second metal complexes are used in combination. They may be used as a catalyst composition containing both the first and the second metal complex. Alternatively, the first, and second metal complex may not be used in the same composition but as separate compositions. Preferably, the first and second metal complex are combined in a catalyst composition comprising them.

The ratio of the first metal complex and the second metal complex may be adjusted to provide a molar ratio of the group 4 metal of the first metal complex to the group 4 metal of the second catalyst complex. Preferably the molar ratio of the group 4 metal of the first metal complex to the group 4 metal of the second metal complex is from 1:0.1 to 1:100, in particular from 1:0.2 to 1:80, more preferably from 1:0.5 to 1:10. In a preferred embodiment of the present disclosure that catalyst mixture contain the first and second metal complexes in amounts such that that the molar ratio of the group 4 metal of the first metal complex to the group 4 metal of the second catalyst complex is about 1:1 to 1:3.

The catalyst composition may also contain further catalysts. Preferably, the catalyst mixture according to the present disclosure contains more than 95 wt.-%, in particular more than 99 wt.-% based on the total weight of the catalyst mixture of the first metal complex and the second metal complex.

One or more activator (b) and, optionally, one or more scavenger (c) may be used either in the catalyst composition or may be added separately for example before or along with feeding the monomers to the catalyst mixture.

Activators (b) for single-site catalysts as known in the art can be used. The activators often comprise a group 13 atom, such as boron or aluminium.

In a preferred embodiment the activators (b) are selected from boranes (C1), borates (C2 or C3). Preferably a combination of one or more activator according to C1, C2 and C3 is used in combination with one or more scavengers according to (c).

Suitable boron activators (C1) can be represented by the general formula $BQ_1Q_2Q_3$.

Suitable borate activator according to (C2) can be represented by the general formula $G(BQ_1Q_2Q_3Q_4)$.

Suitable borate activators according to ($C_3$) can be represented by the general formula $(J\text{-}H)(BQ_1Q_2Q_3Q_4)$, In the activator according to (C1) B is boron and $Q_1$ to $Q_3$ are substituted or unsubstituted aryl groups, preferably phenyl groups. Suitable substituents include but are not limited to halogens, preferably fluoride, and $C_1$ to $C_{40}$ hydrocarbyls, preferably $C_1$ to $C_{20}$ alkyls or aromatics. Specific examples of activators according to (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenyl-bis(pentafluoro-phenyl)borane and the like, and tris(pentafluorophenyl)borane is most preferable.

In the activator according to (C2) G is an inorganic or organic cation, B is boron and $Q_1$ to $Q_3$ are the same as in (C1) and $Q_4$ is also a substituted or unsubstituted aryl group, preferably a substituted or unsubstituted phenyl. Substituents include but are not limited to halogens, preferably fluoride, and $C_1$ to $C_{40}$ hydrocarbyls, preferably $C_1$ to $C_{20}$ alkyls or aromatics. Specific examples for the borate group $(BQ_1Q_2Q_3Q_4)$ include but are not limited to tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, teterakis(2,3,4-trifluorophenyl)borate, phenyltris(pentafluoro-phenyl) borate, tetrakis(3,5-bistrifluoromethylphenyl)borate and the like. Specific examples of G include a ferrocenium cation, an alkyl-substituted ferrocenium cation, silver cation and the like. Specific examples of an organic cation G include a triphenylmethyl cation and the like. G is preferably a carbenium cation, and particularly preferably a triphenylmethyl cation.

In the activator according to (C3) J represents a neutral Lewis base, (J-H) represents a Bronsted acid, B is a boron and both $Q_1$ to $Q_4$ and the borate group $(BQ_1Q_2Q_3Q_4)$ are the same as in (C2). Specific examples of the Bronsted acid (J-H) include a trialkyl-substituted ammonium, N,N-dialkylanilinium, dialkylammonium, triaryl phosphonium and the like. Specific examples of activators according to (C3) include but are not limited to triethylammoniumtetrakis(pentafluoro-phenyl)-borate, tripropylammoniumtetrakis(pentafluorophenyl)borate, tri(n-butyl)ammonium-tetrakis(pentafluorophenyl)borate, tri(n-butyl)ammoniumtetrakis(3,5-bistrifluoromethyl-phenyl)borate, N,N-dimethylaniliniumtetrakis(pentafluoro-phenyl)borate, N,N-diethylaniliniumtetrakis(penta-fluorophenyl)borate, N,N-2,4,6-pentamethylanilinium-tetrakis(pentafluorophenyl)borate, N,N-dimethylanilinium-tetrakis(3,5-bistrifluoromethyl-phenyl)borate, diisopropylammoniumtetrakis(penta-fluorophenyl)borate, dicyclohexyl-ammoniumtetrakis-(pentafluorophenyl)borate, triphenylphosphoniumtetrakis(penta-fluorophenyl)borate, tri(methylphenyl)phosphoniumtetrakis(pentafluorophenyl) borate, tri(dimethylphenyl)-phosphonium-tetrakis(pentafluorophenyl)borate and the like, and tri(n-butyl)ammonium-tetrakis(pentafluorophenyl)borate or N,N-dimethylaniliniumtetra-kis(pentafluoro-phenyl)borate is most preferable.

Preferably the boron containing activator is selected from activators according to ($C_2$) more preferably from the group consisting of triphenylmethyl-tetrakis(pentafluorophenyl) borate, triphenylmethyl-tetrakis(2,3,5,6-tetrafluorophenyl) borate, triphenylmethyl-tetrakis(2,3,4,5-tetrafluorophenyl) borate, triphenylmethyl-tetrakis(3,4,5-trifluorophenyl) borate, triphenylmethyl-teterakis(2,3,4-trifluorophenyl) borate, triphenylmethyl-phenyltris(pentafluoro-phenyl) borate and triphenyl-methyl-tetrakis(3,5-bistrifluoromethylphenyl)borate. Most preferably the activator includes triphenyl-methyltetrakis(pentafluorophenyl)borate.

A scavenger (c) is a compound that reacts with impurities that are poisonous for the catalyst and thus can prolong the life-time of the catalyst.

In another preferred embodiment of the present disclosure the scavenger (c) is a hydrocarbyl of a metal or metalloid of group 1-13 or its reaction product with at least one sterically hindered compound containing a group 15 or 16 atom. Preferably, the group 15 or 16 atom of the sterically hindered compound bears a proton. Specific examples include butyllithium including its isomers, dihydrocarbylmagnesium, and hydrocarbylzinc and their reaction products with a sterically hindered compound or an acid, such as HF, HCl, HBr. In another preferred embodiment the scavenger (c) includes one or more organoaluminum compounds (E). While organoaluminum compound according to (E) can also act as activators, they are referred to herein as scavengers.

Suitable organoaluminum-based scavengers (E) include compounds with a carbon-aluminum bond. Examples of suitable scavengers according to (E) preferably include organoaluminums according to (E1) to (E4).

Scavengers according to (E1) are organoaluminum compounds represented by the general formula $T^1{}_aAlZ_{3-a}$.

Scavengers according to (E2) are cyclic aluminoxanes having a structure represented by the general formula $\{—Al(T^2)\text{-}O\text{-}\}_b$.

Scavengers according to (E3) are linear aluminoxanes represented by the general formula $T^3\{—Al(T^3)\text{-}O\text{-}\}_cAlT^3{}_2$.

Scavangers according to (E4) are alkylaluminoxanes, preferably methyl aluminoxane (MAO).

In the above formulae each of $T^1$, $T^2$ and $T^3$ is a hydrocarbon, group, and each $T^1$, $T^2$ and $T^3$ may be the same or different. Z represents a hydrogen atom or a halogen atom, and all Z's may be the same or different. 'a' represents a number satisfying $0<a\leq3$, 'b' is an integer of 2 or more, and 'c' is an integer of 1 or more.

The hydrocarbon group in (E1), (E2) or (E3) is preferably a hydrocarbon group having 1 to 8 carbon atoms, and more preferably an alkyl group.

Specific examples of the organoaluminum compounds according to (E1) include trialkylaluminums such as trimethylaluminum, triethylaluminum, tripropylaluminum, triisobutylaluminum, trihexylaluminum, trioctylaluminum and the like; dialkylaluminum chlorides such as dimethylaluminum chloride, diethylaluminum chloride, dipropylaluminum chloride, diisobutylaluminum chloride, dihexylaluminum chloride and the like; alkylaluminum dichlorides such as methylaluminum dichloride, ethylaluminum dichloride, propylaluminum dichloride, isobutylaluminum dichloride, hexylaluminum dichloride and the like; dialkylaluminum hydrides such as dimethylaluminum hydride, diethylaluminum hydride, dipropylaluminum hydride, diisobutylaluminum hydride, dihexylaluminum hydride and the like. Trialkylaluminums are preferred and triethylaluminum, triisobutylaluminum and trioctylaluminum (TOA) are most preferred.

Specific examples of cyclic or linear aluminoxanes according to (E2) and (E3) include those where $T^2$ and $T^3$ are, independently from each other, alkyl groups such as a methyl group, ethyl group, n-propyl group, isopropyl group, n-butyl group, isobutyl group, n-pentyl group, neopentyl group and the like, b is an integer of 2 or more and c is an integer of 1 or more. Preferably, $T^2$ and $T^3$ represent a methyl group or isobutyl group, and b is 2 to 40 and c is 1 to 40. A specific example for (E4) includes but is not limited to methylaluminoxane (MAO).

In a preferred embodiment of the present disclosure a combination of at least one activator according to C1, C2 or C3 with at least one scavenger according to (E) is employed in the polymerization. Preferred scavengers according to (E) include those of (E1) and MAO. Preferably at least one other scavenger according to (E) is used in combination with a sterically hindered hydrocarbon, preferably a sterically hindered phenol, containing a group 15 or 16 heteroatom, (preferably O, N, P and S atoms, more preferably O and N heteroatoms). Specific examples of sterically hindered hydrocarbons include but are not limited to tert-butanol, iso-propanol, triphenylcarbinol, 2,6-di-tert-butylphenol, 4-methyl-2,6-di-tert-butylphenol, 4-ethyl-2,6-di-tert-butylphenol, 2,6-di-tert-butylanilin, 4-methyl-2,6-di-tert-butylanilin, 4-ethyl-2,6-di-tert-butylanilin, diisopropylamine, di-tert-butylamine, diphenylamine and the like.

A preferred combination includes triphenylcarbenium tetrakis-perfluorophenylborate triisobutyl aluminium, 4-methyl-2,6-tertbutyl phenol.

The molar ratio of first and second metal complexes: scavenger employed preferably ranges from 0.1:1000 to 0.1:10, more preferably ranges from 0.1:1000 to 0.1:300, and most preferably from 0.1:500 to 1:100.

The molar ratio of activator to first and second metal complex employed preferably ranges from 5:1 to 1:1.

Polymerization Process

The copolymers according to the present disclosure can be prepared by a process comprising copolymerizing ethylene, at least one $C_3$-$C_{20}$-α-olefin, at least one non-conjugated diene and at least one dual polymerizable diene monomer in the presence of the first and second metal complex described above.

The polymerization can be carried out in the gas phase, in a slurry, or in solution in an inert solvent, preferably a hydrocarbon solvent.

The polymerisation can take place in different polymerization zones. A polymerization zone is a vessel where a polymerization takes place and could be either a batch reactor or a continuous reactor. When multiple reactors are employed (for example multiple reactors connected in series or in parallel), each reactor is considered as a separate polymerisation zone.

The first and second metal complex can be premixed with activators or mixed within the polymerization zone. Similarly, the first and second metal complex may be premixed and fed to the polymerization zone together or added separately for mixture in situ. As such, the additions and mixing may be continuous or batch wise and the same or different activators can be used for each catalyst system.

Preferred solvents include one or more hydrocarbon solvent. Suitable solvents include $C_{5-12}$ hydrocarbons such as pentane, hexane, heptane, octane, cyclohexane, methylcyclohexane, pentamethyl heptane, hydrogenated naphtha, isomers and mixtures thereof. The polymerization may be conducted at temperatures from 10 to 250° C., depending on the product being made. Most preferably the polymerisation is performed at temperatures greater than 50° C., if performed in solution.

In a preferred embodiment the polymerization includes the use of one or more chain transfer agent to control the molecular weight of the polymer. A preferred chain transfer agent includes hydrogen ($H_2$).

Compounded Polymer Compositions

The copolymers provided herein can be cured (crosslinked) in the presence of a curing agent, i.e. the copolymers are curable.

In another embodiment of the present disclosure, the polymer composition produced herein further includes one or more additional polymers and/or additives, thereby forming a compounded polymer composition. Thus, processes of various embodiments may further include blending the ethylene-copolymer according to the present disclosure with one or more additional polymer components and/or additives. In general, any additional polymer component and/or any additive or other additional component suitable for a conventional EP or EPDM formulation will be suitable for compounding. Suitable additives include additives known in the art for elastomer formulations, such as EPDM formulations. Examples of additives include, but are not limited to, any one or more of: extender oils; plasticizers; processing aids such as fatty acids, waxes, and the like; antioxidants (e.g., hindered phenolics such as commercially available under the trade designation IRGANOX 1010 or IRGANOX 1076; phosphites (for example those commercially available under the trade designation IRGAFOS 168; curatives or crosslinking agents (either or both of curing agents and co-agents, such as zinc oxide, peroxides, phenolic resins, and the like); fillers (including carbon blacks, calcium carbonates, clays, silicas and the like); antiozonants; scorch inhibiting agents; anti-cling additives; tackifiers (such as polybutenes, terpene resins, aliphatic and aromatic hydrocarbon resins, alkali metal and glycerol stearates, and hydrogenated rosins, and the like); UV stabilizers; heat stabilizers; anti-blocking agents; release agents; anti-static agents; pigments; colorants; dyes; talc; and other additives known in the art. “Extender oil” refers to a compound comprising carbon and hydrogen, which is a liquid at 25° C. Extender oils include various paraffins and paraffin blends, dearomaticized aliphatic hydrocarbons, high purity hydrocarbon fluids, polyalphaolefins, polybutenes, mineral oils, and the like. The compounds may be curable. The compounds may also be cured, i.e. they contain one or more curing agent and may have been subjected to a curing reaction.

Applications

The ethylene copolymers according to the present disclosure, including compounds thereof, may be used in a variety of end-use applications, including any application suitable for EP or EPDM copolymers. The ethylene-copolymers according to the present disclosure, including compounds thereof, may be particularly suitable for extrusion and may be subjected to extrusion to one or more die, in particular for making extruded articles.

Examples

Test Methods

Comonomer Composition

Fourier transformation infrared spectroscopy (FT-IR) was used to determine the composition of the copolymers according to ASTM D3900 (revision date 2017) for the C2/C3 ratio and D6047 (revision date 2017) for the diene content on pressed polymer films.

Phase Angle Measurements

The polymer branching was determined by phase angle measurements on a Montech MDR 3000 moving die rheometer with parameter $\Delta\delta$. $\Delta\delta$ (expressed in degrees) is the difference between the phase angle $\delta$ measured at a frequency of 0.1 rad/s and the phase angle $\delta$ measured at a frequency of 100 rad/s determined by Dynamic Mechanical Analysis (DMA) at 125° C. $\Delta\delta$ is a measure for the presence of long chain branches in the polymer structure. The lower the value of $\Delta\delta$ the more long chain branches are present in the polymer and has been introduced by H. C. Booij, in Kautschuk+Gummi Kunststoffe, Vol. 44, No. 2, pages 128-130, 1991, which is incorporated herein by reference.

Size Exclusion Chromatography with Differential Viscometry (SEC-DV)

The molecular weight distribution (MWD) and the intrinsic viscosity for the determination of the branching degree g'(III) were determined by gel permeation size exclusion chromatography with differential viscometry (GPC/SEC-DV) using a Polymer Char GPC from Polymer Characterization S. A, Valencia, Spain. The Size Exclusion Chromatograph was equipped with an online viscometer (Polymer CharV-400 viscometer), an online infrared detector (IR5 MCT), with 3 AGILENT PL OLEXIS columns (7.5×300 mm) and a Polymer Char autosampler. Universal calibration of the system was performed with polyethylene (PE) standards.

The polymer samples were weighed (in the concentration range of 0.3-1.3 mg/ml) into the vials of the PolymerChar autosampler. In the autosampler the vials were filled automatically with solvent (1,2,4-tri-chlorobenzene) stabilized with 1 g/l di-tertbutylparacresol (DBPC). The samples were kept in the high temperature oven (160° C.) for 4 hrs. After this dissolution time, the samples were automatically filtered by an in-line filter before being injected onto the columns. The chromatograph system was operated at 160° C. The flow rate of the 1,2,4-trichlorobenzene eluant was 1.0 mL/min. The chromatograph contained a built-in on-line infrared detector (IR5 MCT) for concentration and a built-in PolymerChar on-line viscometer.

For determining the branching degree g'(III), the weight-average intrinsic viscosity $[\eta]$ of the ethylene copolymer was determined by size-exclusion chromatography with differential viscometry (SEC-DV).

The apparent weight-average viscosity $[\eta]^*$ of the linear reference copolymer of the same ethylene-$\alpha$-olefin composition was determined by the viscosity of a liner polyethylene reference polymer corrected for the $\alpha$-olefin of the ethylene-copolymer tested according the principle developed in Th. G. Scholte, N. L. J. Meijerink, H. M. Schoffeleers, A. M. G. Brands, J. of Appl. Pol. Sci., Vol, 29, 3763-3782 (1984) and in international patent application WO99/00434A1 to Evens et al. both incorporated herein by reference. The degree of branching can be determined by means of the Mark-Houwink equation, which gives the relation between the molecular weight (M) and the intrinsic viscosity $[\eta]$ of the copolymer according to $$[\eta]=KM^a$$

wherein K and a are the Mark-Houwing parameters and depend on the particular polymer-solvent system. For a pure copolymer without long chain branching the relation between log (n) and log (M) is described by a linear relation. Long chain branching results in a deviation of the linear relation between log (q) and log (M). The relation between log (q) and log (M) becomes less linear as the degree of branching increases. Size Exclusion Chromatography combined with differential viscometry (SEC-DV) can be used to determine molecular weight distributions (MWDs) and degree of branching for elastomeric copolymers. According to the universal callibration principal log ($[\eta_i]^x$ $M_i$) vs retention volume=constant (with $[\eta_i]$ representing the intrinsic viscosity, $M_i$ the molecular weight and "i" being the $i^{th}$-elution fraction in the SEC-DV chromatogram).

The experimental Mark-Houwink equation yields information on the degree of branching if this equation is compared with the Mark-Houwink equation for linear polymers, which is used as reference. Branching is understood to be a branch in the polymer chain, which is longer than a branch produced by the incorporation of a single molecule of the α-olefin or of a polyene.

The reference Mark Houwink equation is dependent on the average ethylene/α-olefin composition of the polymer. According to Th.G. Scholte, N. L. J. Meijerink, H. M. Schoffeleers, A. M. G. Brands, J. of Appl. Pol. Sci., Vol, 29, 3763 3782 (1984) incorporated herein by reference, the following holds for the Mark-Houwink equation of a linear ethylene-propylene (EP) reference copolymer:

$$[\eta]^*=(1-1/3W3)^{(1+\alpha)}K_{PE}(Mv^*)^a$$

where: $[\eta]^*$ is the apparent weight-average intrinsic viscosity of a linear copolymer with an ethylene/α-olefin composition corresponding to that of the ethylene copolymer tested (in dl/g);

$K_{PE}$ is the Mark-Houwink constant for linear polyethylene (PE);

a is the Mark-Houwink constant for linear polyolefinic copolymers;

Mv* is the apparent, viscosity-average molecular weight, defined as:

$$M_v^* = \left(\frac{\sum w_i(M_i^*)^a}{\sum w_i}\right)^{\frac{1}{a}}$$

where:

$w_i$ is the weight fraction belonging to elution fraction i,

M*i is the apparent molecular weight for elution fraction i.

$K_{PE}$ and a are determined experimentally for the solvent and temperature used in the SEC-DV. ($K_{PE}$ is $4.06.10^{-4}$, measured in 1,2,4-trichlorobenzene at 135° C. and a is 0.725, measured in 1, 2, 4 trichlorobenzene at 135° C.). Mv* is determined from the linear PE reference polymer for the same molecular weight.

For an ethylene-copolymer with propylene as α-olefin W3 is the propylene weight fraction. W3 is calculated according to the formula: W3=C3/(C3+C2) where C2 and C3 represent, respectively, the ethylene content and the propylene content of the ethylene-copolymer (in mass %). The amounts of dual polymerizable and non-conjugated diene monomers are small and their presence is ignored for determing $[\eta]^*$. If other α-olefin units are also present their amounts are also ignored and the calculation is based on the propylene content as described above. For ethylene copolymers with α-olefin copolymers other than propylene and no propylene the value of $[\eta]^*$ is corrected according to the guidelines presented in the above-mentioned article by Th. G. Scholte et al. cited above.

Mooney Viscosity

The Mooney viscosity of the copolymer samples was measured according to ISO 289, revision date 2015, with biaxially strained PP (20 μm thickness) film, provided by Perfon. The measuring conditions were ML(1+4) @125° C.

Mooney viscosity (measuring conditions ML(1+4) @100° C.) of the compounds was measured according to DIN 53523-3 (with NatureFlex NP/28 μm, manufactured by Putz Folien, D-65232 Taunusstein Wehen).

Intensity Ratio (D)

The intensity ratio was determined by $^{13}C$ NMR spectra. Copolymer samples were dissolved in $C_2D_2Cl_4$ at 100° C. and DBPC (di-tertbutylparacresol) was added as stabilizer. The $^{13}C$ NMR spectrum was recorded on a Bruker Avance spectrometer operating at 500 MHz (125 MHz for $^{13}C$) equipped with a 10 mm probe head heated at 100° C. A standard power gated decoupling pulse sequence was used. In total 512 scans were taken with a 20 second relaxation delay. Data was processed using Bruker TopSpin 3. For the Fourier transform 1 Hz line broadening was applied. The intensity ratio D was calculated from the ratio of the peak intensities of the $CH_2$— group in direct vicinity to two tertiary carbon atoms (Sαα) and the $CH_2$— group in direct vicinity of one tertiary carbon atoms and one secondary atom (Sαβ). For propylene as $C_3$-$C_{20}$ α-olefin the signal of the carbon atoms Sαβ was the sum of the resonance at 34.7 ppm and 35.6 ppm. The signals of the carbon atoms Sαα were between 42 and 48 ppm. Since also some diene signal may appear in this region a correction for the signals from such dienes was made. The area (integral) of the signals for the carbon atoms Sαβ over the area (integral) of the signals for the carbon atoms Sαα yields the so-called intensity ratio D. The calculations were done using baseline corrected integrals; baseline correction was applied manually around the region of interest.

Cat A

The first catalyst (Cat A) was an amidinato titanium complex of the general formula $((CH_3)_5Cp\text{-}Ti—(CH_3)_2)(NC(2,6\text{-}C_6H_3F_2)(N((CH(CH_3)_2)_2$ or abbreviated as $Me_5CpTiMe_2(NC(2,6\text{-}F_2Ph)(^iPr_2N)$ with "Me" representing "methyl" and $^iPr$ representing "isopropyl". The catalyst was prepared as described in WO 2005/090418 A1 (incorporated herein by reference), compound 10M:

A solution of methyl magnesium bromide (16.5 mL, 3.0 M solution in diethylether, 49.5 mmol) was added to a solution of $Me_5CpTiCl_2(NC(2,6\text{-}F_2Ph)(iPr_2N)$ (12.18 g, 24.7 mmol) in toluene (100 mL) at −78° C. The reaction mixture was stirred at room temperature for 18 hours. The reaction mixture was filtered and the solvent from the filtrate was removed in vacuo. The residue was triturated with hexane (100 mL) resulting in 10.9 g of pure product as a yellow powder (97%). These crystals were characterized by $^1H$ NMR (300 MHz) ($CDCl_3$) δ (ppm): 7.8 (d pent, 1H), 7.0 (dd, 2H), 4.0 (bs, 1H) 3.8 (sept, 1H), 1.9 (s, 15H), 1.8 (d, 6H), 1.3 (d, 6H), 0.0 (s, 6H) and by $^{13}C$-NMR (75.5 MHz) ($CDCl_3$) δ (ppm): 157.3 (dd, J=248 Hz and J=8 Hz), 146.5, 127.1 (t, J=10 Hz), 118.7, 117.2 (t, J=25 Hz), 110.3 (m), 50.5, 47.1, 45.9, 20.1, 19.4, 10.3.

Cat B

The second catatlyst (Cat B) was the zirconium metallocene catalyst $Me_2Si(Ind)_2ZrMe_2$, wherein "Me" represents "methyl" and "Ind" represents an "indenyl" ligand. The catalyst was synthesized according to Spalek et *alii*, Angew.

Chem. Int. Ed. Engl. 28(1989), no. 11 and Bochmann et alii, Organometallics, vol 13, No. 6, 1994.

Examples 1, 2 and 3 (E1, E2, E3)

Polymerization to provide the polymers of examples E1, E2 and E3 were carried out as follows: Polymerisations were carried out in two liquid filled solution polymerisation reactors connected in series. Both reactors had a volume of 3 liters. The feed streams were purified by contacting them with various absorption media to remove catalyst-killing impurities such as water, oxygen and polar compounds. The process was continuous in all feed streams. Premixed solvent (a mixture of hexane isomers with a boiling point range of 65° C. to 70° C., propene, ethylene, diene, dual polymerizable diene monomer, hydrogen, tri-isobutyl aluminium (TIBA) and 2,6-ditertbutyl-4-methyl-phenol (BHT) were precooled before being fed to the reactor. The solution containing a mixture of the first and second metal complex (CAT A/CAT B) and the solution of triphenylcarbenium tetrakis-perfluorophenylborate activator (TBF20) were fed separately to the reactor. The molar ratio of TIBA/BHT was 1/1, the TIBA feed rate was 1.2 mmol/h. The molar ratio TBF20/(Cat A+Cat B) was 2/1. The total pressure was 20 barg. Further details are shown in table 1. The hydrogen feed was adjusted to achieve the desired polymer Mooney viscosity as given in Table 1. The pressure was maintained at 20 barg. The polymer solution was continuously removed from the second reactor through a discharge line, where a solution of Irganox®1076 in iso-propanol was added to stop further polymerization reactions and to stabilize the polymer. Subsequently, residual monomers and solvent were removed by a continuous steam stripping step yielding the polymer crumb.

The EPDM polymers obtained were dried batch wise on a mill.

The composition and properties of EPDM polymers E1, E2 and E3 are also shown in table 1. The EPDM polymers had a broad MWD and significantly branching.

TABLE 1

Polymerization results.

| | E1 | E2 | E3 |
|---|---|---|---|
| T1 [° C.] | 77.7 | 90.3 | 79.9 |
| T2 [° C.] | 72.6 | 88.5 | 91.6 |
| CAT A [μmol/h] | 2.7 | 5.4 | 2.7 |
| CAT B [μmol/h] | 3.8 | 7.6 | 5.4 |
| Prod [g/h] | 1291 | 1290 | 1402 |
| C2 [conv %] | 88.7 | 87.9 | 90.3 |
| $H_2$ [NL/h] | 0.12 | 0 | 0.01 |
| VNB [mmol/h] | 102 | 94 | 122 |
| Mooney (ML 1 + 4, 125° C.) [MU] | 82 | 89 | 79 |
| C2 [wt %] | 49.0 | 49.3 | 49.9 |
| ENB [wt. %] | 5.48 | 5.82 | 6.37 |
| VNB [wt. %] | 0.48 | 0.49 | 0.57 |
| Δδ [° C.] | 19 | 16 | 13 |
| Mn [kDa] | 63 | 48 | 49 |
| Mw [kDA] | 290 | 360 | 350 |
| Mz [kDa] | 780 | 1100 | 1100 |
| Mw/Mn | 4.6 | 7.6 | 7.2 |
| g'(III) | 0.92 | 0.93 | 0.87 |

In table 1 T1 is the temperature in reactor 1, T2 is the temperature in reactor 2, Prod means the polymer production rate in grams per hour, C2 means units derived from ethylene. The remainder of the polymer was made up of units derived from propylene.

In table 1 T1 is the temperature in reactor 1, T2 is the temperature in reactor 2, Prod means the polymer production rate in grams per hour, 02 means units derived from ethylene. The remainder of the polymer was made up of units derived from propylene.

The polymers prepared as described above (examples 1 and 2, E1, E2, E3) were compared with EPDM polymers (comparative examples 1-3, C1, C2, C3 and $C_4$) of similar co-monomer composition but that were prepared differently and had different micro- and macrostructures as shown in table 2. The copolymers of C2 and C3 were prepared using a Ziegler-Natta catalyst. The copolymer of C1 was prepared only with catalyst A. The copolymer of C4 was prepared using a combination of a mono-cyclopentadienyl titanium catalyst $(CH_3)_4CH(CH_3)_2Cp\text{-}Ti\text{—}(CH_3)_2(NC(2,6\text{-}C_6H_3F_2)NC_5H_{10})$ and a mono-indenyl-titanium complex $[(Indenyl)\text{-}Ti(CH_3)_2(NC(C_6H_5)(N((CH(CH_3)_2)_2]$ as second metal complex. The intensity ratio was not measured but is believed to be less than 0.5.

TABLE 2

| | ML* (MU) | C2 (wt %) | ENB (wt %) | VNB (wt %) | Δδ (°) | Mn (Kda) | Mw (Kda) | Mz (Kda) | MWD | g'(III) | R | D $S_{\alpha\beta}/S_{\alpha\alpha}$ |
|---|---|---|---|---|---|---|---|---|---|---|---|---|
| C1 | 79 | 47.8 | 5.73 | 0.35 | 18 | 88 | 290 | 790 | 3.3 | 0.88 | 4.8 | 0.06 |
| C2 | 73 | 54.2 | 5.1 | <0.04 | 17 | 72 | 330 | 2100 | 4.6 | 0.77 | 7.9 | 1.16 |
| C3 | 95 | 51.9 | 5.85 | <0.04 | 10 | 70 | 340 | 1500 | 4.9 | 0.77 | 7.9 | 1.23 |
| C4 | 76 | 49.0 | 7.20 | 0.50 | 4 | 62 | 390 | 1800 | 6.3 | 0.69 | 10.1 | — |
| E1 | 82 | 49.0 | 5.48 | 0.48 | 19 | 63 | 290 | 780 | 4.6 | 0.92 | 4.3 | 0.12 |
| E2 | 89 | 49.3 | 5.82 | 0.49 | 16 | 48 | 360 | 1100 | 7.6 | 0.93 | 4.3 | 0.09 |
| E3 | 79 | 49.9 | 6.37 | 0.57 | 13 | 49 | 350 | 1100 | 7.2 | 0.87 | 5.1 | — |

* ML = Mooney viscosity; measuring conditions ML 1 + 4, 125° C.

Preparation and Properties of Compounds

The polymers C1-C4, E1, E2 and E3 were used to make compounds using the ingredients listed in table 3. The compounds were prepared on an internal mixer (GK1,5 E1 from Harburg-Freudenberger Maschinenbau GmbH; ram pressure 8 bar, 50 rpm, 72% degree of filling and total mixing time 5 min). The curing system was added on an open mill (200 mm roll diameter; 20 rpm, 4000 roll temperature and friction 1.22).

TABLE 3

Ingredients for making compounds

| Ingredient | Chemical composition | Amount, phr |
|---|---|---|
| EPDM | EPDM polymer obtained according to examples E1, E2, E3, C1, C2, C3, C4 | 100 |
| SUNPAR ® 2280 | Paraffinic oil | 39 |
| RU CORAX ® N 550 | carbon black | 60 |
| EDENOR ® C18-98 MY | Stearic acid | 1 |
| RHENOGRAN ® S-80 | 80% sulfur on carrier | 1.25 |
| ZINKOXYD AKTIV | Zinc Oxide | 5 |
| RHENOGRAN ® CAO 80 | 80% Calcium oxide on carrier | 5 |
| RHENOGRAN ® MBTS-80 | 80% dibenzothazole disulfide on carrier | 1.31 |
| RHENOGRAN ® TP-50 | 50% zinc dialkyldithiophosphate on carrier | 3.5 |

TABLE 3-continued

Ingredients for making compounds

| Ingredient | Chemical composition | Amount, phr |
|---|---|---|
| RHENOGRAN ® ZBEC-70 | 70% zinc-dibenzyl-dithiocarbamate on carrier | 0.7 |
| VULKALENT ® E/C | N-phenyl-N-(trichloromethylsulfenyl)-benzene sulphonamide | 0.5 |
| Total loading | | 217.26 |

Phr (parts per hundred parts of rubber) = parts of the individual component based on 100 parts of rubber.

The compounds were tested for their mechanical and elastic properties. Test plates were prepared from the compounds (2 mm and 6 mm thickness) that were press cured at 180° C. for a time equivalent to 1.1 and 1.25 times the t90 value. (t90 is the time to reach 90% of maximum torque during the rheometer measurement). The compounds were tested for compound Mooney viscosity and ΔS. Rheometry data (ΔS=torque difference MH-ML@180° C.) were obtained according to DIN 53529. The cured sample were examined for compression set (CS), tensile strength at break (TS) and elongation at break (EB). The compression set (CS) were determined according to DIN ISO 815. The shore A hardness (H) was determined according to DIN ISO 7629-1. The tensile strength at break (TS) and the elongation at break (EB) were determined according to DIN ISO 37. The results are shown in table 4.

TABLE 4

Test results of uncured and cured compounds

| | Mw/Mn | Δδ (°) | ML(1 + 4) 100° C. (MU) | TS (Mpa) | EB (%) | CS, 24 h 100° C. (%) | CS, 72 h 23° C. (%) | H (shore A) | ΔS (dNm) |
|---|---|---|---|---|---|---|---|---|---|
| C1 | 3.3 | 18 | 71 | 15 | 457 | 35 | 6 | 59 | 17 |
| C2 | 4.6 | 17 | 61 | 14 | 431 | 31 | 7 | 58 | 15 |
| C3 | 4.9 | 10 | 67 | 15 | 409 | 27 | 5 | 57 | 16 |
| C4 | 6.3 | 4 | 52 | 16 | 446 | 33 | 5 | 58 | 16 |
| E1 | 4.6 | 19 | 67 | 14 | 439 | 31 | 5 | 58 | 15 |
| E2 | 7.6 | 16 | 66 | 16 | 467 | 32 | 5 | 57 | 14 |
| E3 | 7.2 | 13 | 59 | 14 | 460 | 33 | 5 | 55 | 15 |

Figure 2:
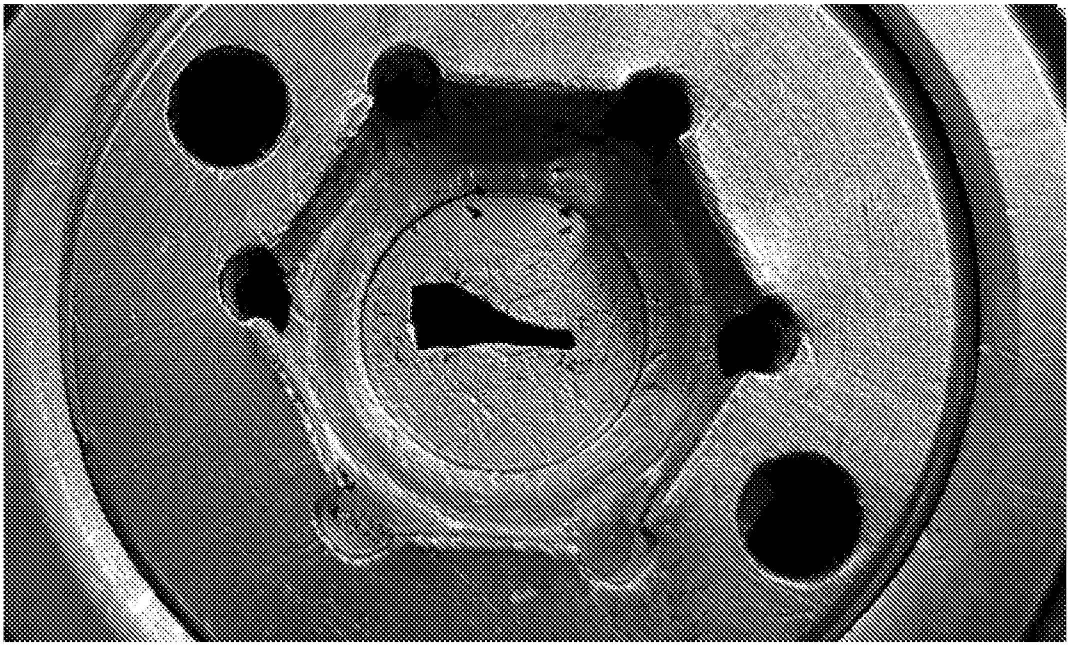
FIG. 2 is a photograph of the Garvey profile used in the extrusion experiments.

Extrusion Experiments:

Profiles were extruded from the unvulcanised compound in a Brabender 19 mm extruder through a Garvey profile (shown FIG. 2, die diameter 4 mm), according to the following settings:

Housing/mould and screw temperature=100° C.

Measuring time=60 seconds

Roll speed=50 rpm

Nozzle diameter=4 mm

The extruded strips obtained in the extrusion experiments are shown in FIG. 1. The profiles formed from the copolymers E1 (profile a) in FIG. 1), E2 (profile bin FIG. 1) and E3 (profile f) in FIG. 1) were of high quality and had smooth surfaces. The profiles obtained with comparative polymers C1, C2 and C3 had a less smooth surface and displayed various surface defects (the profiles c), d) and e) shown in FIG. 1). C4 gave extrudates with similar properties as E1 and E2 (not shown in FIG. 1), however at a higher branching density (lower A5) and at a higher diene (ENB) content (compare table 2) and thus at significantly higher production costs.

The experiments above demonstrate that while the mechanical properties of compounds made from the polymers according to the present disclosure and comparative polymers do not differ greatly and are in both cases satisfying (compare table 4), the polymers according to the present disclosure have significantly improved extrusion behaviour as determined in the extrusion test (compare FIG. 1) and/or could be produced at lower production costs.

The invention claimed is:

1. A copolymer comprising repeating units derived from (a) ethylene, (b) at least one $C_3$-$C_{20}$ α-olefin, (c) at least one dual polymerizable diene, (d) at least one non-conjugated diene with 6 to 30 carbon atoms other than the dual polymerizable diene and, wherein the copolymer has (i) an intensity ratio D of ≤0.5 as determined by $C^{13}$-NMR spectrometry, (ii) a branching index dD of from 5° to 50°, wherein dD is the difference between the phase angle δ measured at a frequency of 0.1 rad/s and the phase angle δ measured at a frequency of 100 rad/s by dynamic mechanical analysis (DMA) at 125° C.;

(iii) a branching index g'(III) between 0.50 and 0.99 and (iv) a molecular weight distribution (MWD)≥R and R depends on the branching index g'(III) of the copolymer, wherein R is −27.7 times g'(III)+29.2 when g'(III) is ≤0.90; and wherein R is 4.3 when g'(III) is >0.90 and up to 0.99, wherein g'(III) and the molecular weight distribution are determined by gel permeation size exclusion chromatography, and wherein the copolymer comprises from 30 wt. % and up to 85 wt. % of units derived from ethylene, from 5 to 80 wt. % of units derived from $C_3$-$C_{20}$ α-olefin and from 2 wt. % to 20 wt. % of units derived from non-conjugated diene other than the dual polymerizable diene wherein the wt. % are based on the total weight of the polymer which is 100 wt. %, and wherein the at least one dual polymerizable diene is selected from the group consisting of 1,4-divinylcyclohexane, 1,3-divinylcyclohexane, 1,3-divinylcyclopentane, 1,5-divinylcyclooctane, 1-allyl-4-vinylcyclo-hexane, 1,4 diallyl cyclohexane, 1-allyl-5-vinylcyclooctane, 1,5-diallylcyclooctane, 1-allyl-4-isopropenyl-cyclohexane, 1-isopropenyl-4-vinylcyclohexane and 1-isopropenyl-3-vinylcyclopentane, dicyclopentadiene, 1,4-cyclohexadiene, 5-vinyl-2-norbornene (VNB), 2,5-norbornadiene, and combinations thereof.

2. The copolymer of claim 1, wherein g'(III) is from 0.70 to 0.98 or from 0.80 to 0.97 and a phase angle difference Δδ between 5° and 35°.

3. The copolymer of claim 1, wherein the MWD is between 4.5 and 50.

4. The copolymer of claim 1, wherein the intensity ratio D is in the range from 0.02 up to and including 0.4.

5. The copolymer of claim 1, wherein the $C_3$-$C_{20}$ α-olefin is selected from propylene.

6. The copolymer of claim 1, wherein the non-conjugated diene with 6 to 30 carbon atoms comprises vinylcyclohexene, dicyclopentadiene, cyclooctadiene, 5-methylene-2-norbornene, 5-ethylidene-2-norbornene and combinations thereof.

7. The copolymer of claim 1, wherein the copolymer contains from 2 wt. % to 6.7 wt. % of units derived from non-conjugated diene.

8. The copolymer of claim 1, wherein the at least one $C_3$-$C_{20}$-α-olefin comprises propylene, the at least one non-conjugated diene comprises 5-ethylidene-2-norbornene (ENB) and the at least one dual polymerizable diene monomer comprises 5-vinyl-2-norbornene (VNB).

9. The copolymer of claim 1, wherein the at least one dual polymerizable diene comprises 5-vinyl-2-norbornene (VNB) and the content of units derived from VNB is from 0.05 wt % to 5 wt. % or from 0.5 wt. % to 5 wt. %.

10. The copolymer of claim 1, wherein the copolymer is obtained by a polymerization using a first metal complex and a second metal complex, wherein the first metal complex corresponds to formula (1)

$$CyLMZ_p \quad (1),$$

wherein

Cy is a cyclopentadienyl ligand which may contain one or more substituents selected from the group consisting of halogens and aromatic or aliphatic, linear or branched or cyclic residues comprising from 1 to 20 carbon atoms;

M is selected from titanium, hafnium or zirconium;

Z is an anionic ligand selected from the group consisting of halogens, $C_{1-10}$ alkyl groups, $C_{7-20}$ aralkyl groups, $C_{6-20}$ aryl groups, $C_{1-20}$ hydrocarbon-substituted amino groups and combinations thereof;

p is 1 or 2, and

L is a ligand according to formula (2)

(2)

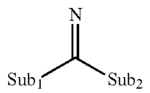

wherein the ligand L is covalently bonded to the metal M via its imine nitrogen atom, $Sub_1$ is a $C_1$-$C_{20}$ alkyl residue or a $C_6$-$C_{20}$ aryl residue, which may be unsubstituted or substituted with substituents selected from halogens and $C_1$-$C_3$ alkyl groups; $Sub_2$ represents the general formula —$NR^4R^5$ with $R^4$ and $R^5$ being independently selected from the group consisting of aliphatic $C_1$-$C_{20}$ hydrocarbyl, halogenated $C_1$-$C_{20}$ aliphatic hydrocarbyl, aromatic $C_6$-$C_{20}$ hydrocarbyl and halogenated aromatic $C_6$-$C_{20}$ hydrocarbyl residues or $R^4$ forming a heterocyclic ring with $R^5$ or with $Sub_1$, or L corresponds to the general formula (2b)

(2b)

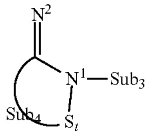

wherein the amidine-containing ligand is covalently bonded to the metal M via the imine nitrogen atom $N^2$; S is a —$CH_2$— unit, and t is an integer and represents 1, 2, 3 and 4, $Sub_3$ represents an aliphatic or aromatic, cyclic or linear substituent comprising a group 14 atom through which $Sub_3$ is bonded to the amine nitrogen atom $N^1$, $Sub_4$ is a $C_2$ unit in which the 2 carbon atoms may be $sp^2$ or $sp^3$ hybridized and wherein the $C_2$ unit may be substituted by one or more halogen atoms, or by one or more $C_1$-$C_{10}$ alkyl groups or $C_1$-$C_{10}$ alkoxy groups;

or wherein

Cy is selected from an unsubstituted or substituted indenyl ligand, a substituted cyclopentadienyl ligand containing at least three methyl groups, or a S-heterocyclic ligand corresponding to the formula (2e):

(2e)

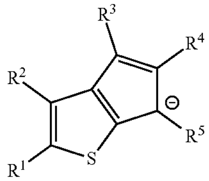

wherein in formula (2e)

$R^1$ and $R^2$ being individually selected from the group of hydrogen, halogen, $C_1$-$C_{10}$ alkyl, $C_5$-$C_{10}$ cycloalkyl, and an unsubstituted or $C_1$-$C_4$-alkyl- or $C_1$-$C_4$-dialkylamino-substituted phenyl or $R^1$ and $R^2$, together with the 2 double bond carbon atoms of the thiophene ring they are connected to, form an unsubstituted or $C_1$-$C_4$-alkyl substituted aliphatic $C_5$-$C_6$-cycloalkene ring, $R^3$, $R^4$ and $R^5$ being individually selected from the group of hydrogen, $C_1$-$C_4$ alkyl, phenyl and $C_1$-$C_4$-alkyl and/or halogen substituted phenyl, and wherein M is titanium, p is 2, Z is methyl or benzyl, $Sub_1$ is selected from phenyl and phenyls having at least one substituent selected from halogens and $C_1$-$C_3$ alkyl;

$Sub_2$ represents —$NR^4R^5$ with $R^4$ and $R^5$ being independently selected from the group consisting of aliphatic $C_1$-$C_{20}$ hydrocarbyl, halogenated $C_1$-$C_{20}$ aliphatic hydrocarbyl, or $R^4$ forming a heterocyclic ring with $R^5$ or with $Sub_1$, and wherein the second metal complex is a bis-indenyl complex and corresponds to the formula (3)

$$J\text{-}Ind_2\text{-}MX_2 \quad (3);$$

wherein $Ind_2$ represents two indenyl ligands to which the metal M is bonded and that are further linked to each other via the bonding group J; the indenyl ligands can be substituted or unsubstituted;

J represents a divalent bridging group linking the two indenyl ligands ($In_2$); wherein J is selected from (a) cyclic units $(R^a{}_2J')_n$ where each J' is independently C or Si, n is 1 or 2, and each $R^a$ is, independently, a $C_1$ to $C_{20}$ substituted or unsubstituted hydrocarbyl, provided that two or more $R^a$ are joined together to form a saturated or partially saturated or aromatic cyclic or fused ring structure that incorporates at least one J' and (b) non-cyclic units $R^b{}_2J'$ wherein each $R^b$ is independently selected from hydrogen, $C_1$-$C_9$ linear or branched hydrocarbyl which may be unsubstituted or substituted and where each J' is independently C or Si;

M is selected from titanium, hafnium or zirconium;

each X is independently a univalent anionic ligand, selected from the group consisting of halogens, $C_{1-10}$ alkyl groups, $C_{7-20}$ aralkyl groups, $C_{6-20}$ aryl groups, $C_{1-20}$ hydrocarbon-substituted amino groups.

11. The copolymer of claim 1 being obtained by a polymerization using a first metal complex and a second metal complex, wherein the first metal complex corresponds to formula (1)

$$CyLMZ_p \quad (1),$$

wherein

Cy is a cyclopentadienyl ligand which may contain one or more substituents selected from the group consisting of halogens and aromatic or aliphatic, linear or branched or cyclic residues comprising from 1 to 20 carbon atoms M is selected from titanium, hafnium or zirconium;

Z is an anionic ligand selected from the group consisting of halogens, $C_{1-10}$ alkyl groups, $C_{7-20}$ aralkyl groups, $C_{6-20}$ aryl groups, $C_{1-20}$ hydrocarbon-substituted amino groups and combinations thereof;

p is 1 or 2, and

L is a ligand according to formula (2)

(2)

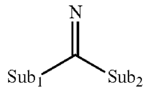

wherein the ligand L is covalently bonded to the metal M via its imine nitrogen atom, $Sub_1$ is a $C_1$-$C_{20}$ alkyl residue or a $C_6$-$C_{20}$ aryl residue, which may be unsubstituted or substituted with substituents selected from halogens and $C_1$-$C_3$ alkyl groups; $Sub_2$ represents the general formula —$NR^4R^5$ with $R^4$ and $R^5$ being independently selected from the group consisting of aliphatic $C_1$-$C_{20}$ hydrocarbyl, halogenated $C_1$-$C_{20}$ aliphatic hydrocarbyl, aromatic $C_6$-$C_{20}$ hydrocarbyl and halogenated aromatic $C_6$-$C_{20}$ hydrocarbyl residues or $R^4$ forming a heterocyclic ring with $R^5$ or with $Sub_1$, or L corresponds to the general formula (2b)

(2b)

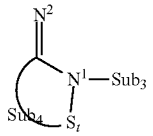

wherein the amidine-containing ligand is covalently bonded to the metal M via the imine nitrogen atom $N^2$;

S is a —$CH_2$— unit, and t is an integer and represents 1, 2, 3 and 4, $Sub_3$ represents an aliphatic or aromatic, cyclic or linear substituent comprising a group 14 atom through which $Sub_3$ is bonded to the amine nitrogen atom $N^1$, $Sub_4$ is a $C_2$ unit in which the 2 carbon atoms may be $sp^2$ or $sp^3$ hybridized and wherein the $C_2$ unit may be substituted by one or more halogen atoms, or by one or more $C_1$-$C_{10}$ alkyl groups or $C_1$-$C_{10}$ alkoxy groups;

or wherein

Cy is selected from an unsubstituted or substituted indenyl ligand, a substituted cyclopentadienyl ligand containing at least three methyl groups, or a S-heterocyclic ligand corresponding to the formula (2e):

(2e)

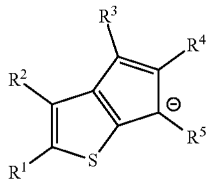

wherein in formula (2e)

$R^1$ and $R^2$ being individually selected from the group of hydrogen, halogen, $C_1$-$C_{10}$ alkyl, $C_5$-$C_{10}$ cycloalkyl, and an unsubstituted or $C_1$-$C_4$-alkyl- or $C_1$-$C_4$-dialkylamino-substituted phenyl or $R^1$ and $R^2$, together with the 2 double bond carbon atoms of the thiophene ring they are connected to, form an unsubstituted or $C_1$-$C_4$-alkyl substituted aliphatic $C_5$-$C_6$-cycloalkene ring, $R^3$, $R^4$ and $R^5$ being individually selected from the group of hydrogen, $C_1$-$C_4$ alkyl, phenyl and $C_1$-$C_4$-alkyl and/or halogen substituted phenyl, and wherein M is titanium, p is 2, Z is methyl or benzyl, $Sub_1$ is selected from phenyl and phenyls having at least one substituent selected from halogens and $C_1$-$C_3$ alkyl;

$Sub_2$ represents —$NR^4R^5$ with $R^4$ and $R^5$ being independently selected from the group consisting of aliphatic $C_1$-$C_{20}$ hydrocarbyl, halogenated $C_1$-$C_{20}$ aliphatic hydrocarbyl, or $R^4$ forming a heterocyclic ring with $R^5$ or with $Sub_1$, and wherein the second metal complex is a bis-indenyl complex and corresponds to the formula (3)

$$J\text{-}Ind_2\text{-}MX_2 \quad (3);$$

wherein $Ind_2$ represents two indenyl ligands to which the metal M is bonded and that are further linked to each other via the bonding group J and wherein each indenyl ligand Ind is unsubstituted or substituted and contains from 1 to 7 alkyl substituents with 1 to 3 carbon atoms;

J is selected from $(H_3C)_2Si$, $(H_5C_2)_2Si$, $(H_7C_3)_2Si$, $H_2C$, $H_3CHC$, $(H_3C)_2C$, $(H_5C_2)_2Si$ and $(H_7C_3)_2Si$, M represents zirconium, both X are selected from $C_1$-$C_{10}$ alkyl groups.

12. A process for making the copolymer of claim 1 comprising copolymerizing ethylene, the at least one $C_3$-$C_{20}$-α-olefin, the at least one non-conjugated diene and the at least one dual polymerizable diene monomer in the presence of at least one first metal complex wherein the first meta complex corresponds to formula (1)

$$CyLMZ_p \quad (1),$$

wherein

Cy is a cyclopentadienyl ligand which may contain one or more substituents selected from the group consisting of halogens and aromatic of aliphatic, linear of branched of cyclic residues comprising from 1 to 20 carbon atoms M is selected from titanium, hafnium or zirconium;

Z is an anionic ligand selected from the group consisting of halogens, $C_{1-10}$ alkyl groups, $C_{1-20}$ aralkyl groups, $C_{6-20}$ aryl groups, $C_{1-20}$ hydrocarbon-substituted amino groups and combinations thereof:

p is 1 or 2, and

L is a ligand according to formula (2)

(2)

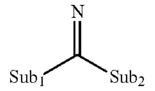

wherein the ligand L is covalently bonded to the metal M via its imine nitrogen atom, $Sub_1$ is a $C_1$-$C_{20}$ alkyl residue or a $C_6$-$C_{20}$ aryl residue, which may be unsubstituted or substituted with substituents selected from halogens and $C_1$-$C_3$ alkyl groups; $Sub_2$ represents the general formula —$NR^4R^5$ with $R^4$ and $R^5$ being independently selected from the group consisting of aliphatic $C_1$-$C_{20}$ hydrocarbyl, halogenated $C_1$-$C_{20}$ aliphatic hydrocarbyl, aromatic $C_6$-$C_{20}$ hydrocarbyl and halogenated aromatic $C_6$-$C_{20}$ hydrocarbyl residues or $R^4$ forming a heterocyclic ring with $R^5$ or with $Sub_3$, or L corresponds to the general formula (2b)

(2b)

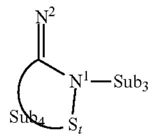

wherein the amidine containing ligand is covalently bonded to the metal M via the imine nitrogen atom $N^2$; S is a —$CH_2$— unit, and t is an integer and represents 1, 2, 3 and 4, $Sub_3$ represents an aliphatic or aromatic, cyclic or linear substituent comprising a group 14 atom through which $Sub_3$ is bonded to the amine nitrogen atom $N^1$, $Sub_4$ is a $C_2$ unit in which the 2 carbon atoms may be $sp^2$ or $sp^3$ hybridized and wherein the $C_7$ unit may be substituted by one or more halogen atoms, or by one or more $C_1$-$C_{10}$ alkyl groups of $C_1$-$C_{10}$ alkoxy groups;

or wherein

Cy is selected from an unsubstituted or substituted indenyl ligand, a substituted cyclopentadienyl ligand containing at least three methyl groups, or a S-heterocyclic ligand corresponding to the formula (2e);

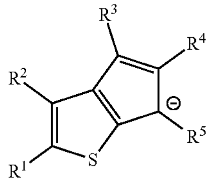
(2e)

wherein in formula (2e)

$R^1$ and $R^2$ being individually selected from the group of hydrogen, halogen, $C_1$-$C_{10}$ alkyl, $C_5$-$C_{10}$ cycloalkyl, and an unsubstituted or $C_1$-$C_4$-alkyl- or $C_1$-$C_4$-dialkylamino-substituted phenyl or $R^1$ and $R^2$, together with the 2 double bond carbon atoms of the thiophene ring they are connected to, form an unsubstituted or $C_1$-$C_4$-alkyl substituted aliphatic $C_5$-$C_6$-cycloalkene ring, $R^3$, $R^4$ and $R^5$ being individually selected from the group of hydrogen, $C_1$-$C_4$ alkyl, phenyl and $C_1$-$C_4$-alkyl and/or halogen substituted phenyl, and wherein M is titanium, p is 2, Z is methyl or benzyl, $Sub_1$ is selected from phenyl and phenyls having at least one substituent selected from halogens and $C_1$-$C_3$ alkyl;

$Sub_2$ represents —$NR^4R^5$ with $R^4$ and $R^5$ being independently selected from the group consisting of aliphatic $C_1$-$C_{20}$ hydrocarbyl, halogenated $C_1$-$C_{20}$ aliphatic hydrocarbyl, or $R^4$ forming a heterocyclic ring with $R^5$ or with $Sub_1$, and wherein the second metal complex is a bis-indenyl complex and corresponds to the formula (3)

$$J\text{-}Ind_2\text{-}MX_2 \qquad (3)$$

wherein $Ind_2$ represents two indenyl ligands to which the metal M is bonded and that are further linked to each other via the bonding group J and wherein each indenyl ligand Ind is unsubstituted or substituted and contains from 1 to 7 alkyl substituents with 1 to 3 carbon atoms;

J is selected from $(H_3C)_2Si$, $(H_5C_2)_2Si$, $(H_7C_3)_2Si$, $H_2C$, $H_3CHC$, $(H_3C)_2C$, $(H_5C_2)_2Si$ and $(H_7C_3)_2Si$, M represents zirconium, both X are selected from $C_1$-$C_{10}$ alkyl groups.

13. The process according to claim 12 further comprising the presence of at least one activator (b) and, optionally, at least one scavenger (c).

14. An extruded article comprising the copolymer of claim 1, wherein the polymer is at least partially cured.

15. A process of making an extruded article comprising providing a compound comprising the copolymer of claim 1 and extruding the compound through at least one die.

16. A composition comprising a first and a second metal complex wherein the first metal complex corresponds to formula (1)

$$CyLMZ_p \qquad (1),$$

wherein

Cy is a cyclopentadienyl ligand which may contain one or more substituents selected from the group consisting of halogens and aromatic or aliphatic, linear or branched or cyclic residues comprising from 1 to 20 carbon atoms;

M is selected from titanium, hafnium or zirconium;

Z is an anionic ligand selected from the group consisting of halogens, $C_{1-10}$ alkyl groups, $C_{7-20}$ aralkyl groups, $C_{6-20}$ aryl groups, $C_{1-20}$ hydrocarbon-substituted amino groups and combinations thereof;

p is 1 or 2, and

L is a ligand according to formula (2)

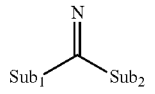
(2)

wherein the ligand L is covalently bonded to the metal M via its imine nitrogen atom, $Sub_1$ is a $C_1$-$C_{20}$ alkyl residue or a $C_6$-$C_{20}$ aryl residue, which may be unsubstituted or substituted with substituents selected from halogens and $C_1$-$C_3$ alkyl groups; $Sub_2$ represents the general formula —$NR^4R^5$ with $R^4$ and $R^5$ being independently selected from the group consisting of aliphatic $C_1$-$C_{20}$ hydrocarbyl, halogenated $C_1$-$C_{20}$ aliphatic hydrocarbyl, aromatic $C_6$-$C_{20}$ hydrocarbyl and halogenated aromatic $C_6$-$C_{20}$ hydrocarbyl residues or $R^4$ forming a heterocyclic ring with $R^5$ or with $Sub_1$, or L corresponds to the general formula (2b)

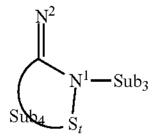
(2b)

wherein the amidine-containing ligand is covalently bonded to the metal M via the imine nitrogen atom $N^2$; S is a —$CH_2$— unit, and t is an integer and represents 1, 2, 3 and 4, $Sub_3$ represents an aliphatic or aromatic, cyclic or linear substituent comprising a group 14 atom through which $Sub_3$ is bonded to the amine nitrogen atom $N^1$, $Sub_4$ is a $C_2$ unit in which the 2 carbon atoms may be $sp^2$ or $sp^3$ hybridized and wherein the $C_2$ unit may be substituted by one or more halogen atoms, or by one or more $C_1$-$C_{10}$ alkyl groups or $C_1$-$C_{10}$ alkoxy groups;

or wherein

Cy is selected from an unsubstituted or substituted indenyl ligand, a substituted cyclopentadienyl ligand containing at least three methyl groups, or a S-heterocyclic ligand corresponding to the formula (2e);

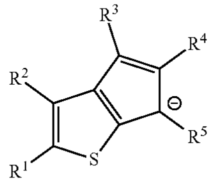
(2e)

wherein in formula (2e)

$R^1$ and $R^2$ being individually selected from the group of hydrogen, halogen, $C_1$-$C_{10}$ alkyl, $C_5$-$C_{10}$ cycloalkyl, and an unsubstituted or $C_1$-$C_4$-alkyl- or $C_1$-$C_4$-dialkylamino-substituted phenyl or $R^1$ and $R^2$, together with the 2 double bond carbon atoms of the thiophene ring they are connected to, form an unsubstituted or $C_1$-$C_4$-alkyl substituted aliphatic $C_5$-$C_6$-cycloalkene ring, $R^3$, $R^4$ and $R^5$ being individually selected from the group of hydrogen, $C_1$-$C_4$ alkyl, phenyl and $C_1$-$C_4$-alkyl and/or halogen substituted phenyl, and wherein M is titanium, p is 2, Z is methyl or benzyl, $Sub_1$ is selected from phenyl and phenyls having at least one substituent selected from halogens and $C_1$-$C_3$ alkyl;

$Sub_2$ represents —$NR^4R^5$ with $R^4$ and $R^5$ being independently selected from the group consisting of aliphatic $C_1$-$C_{20}$ hydrocarbyl, halogenated $C_1$-$C_{20}$ aliphatic hydrocarbyl, or $R^4$ forming a heterocyclic ring with $R^5$ or with $Sub_1$, and wherein the second metal complex is a bis-indenyl complex and corresponds to the formula (3)

$$J\text{-}Ind_2\text{-}MX_2 \quad (3);$$

wherein $Ind_2$ represents two indenyl ligands to which the metal M is bonded and that are further linked to each other via the bonding group J; the indenyl ligands can be substituted or unsubstituted;

J represents a divalent bridging group linking the two indenyl ligands ($In_2$); wherein J is selected from (a) cyclic units $(R^a{}_2J')_n$ where each J' is independently C or Si, n is 1 or 2, and each $R^a$ is, independently, a $C_1$ to $C_{20}$ substituted or unsubstituted hydrocarbyl, provided that two or more $R^a$ are joined together to form a saturated or partially saturated or aromatic cyclic or fused ring structure that incorporates at least one J' and (b) non-cyclic units $R^b{}_2J'$ wherein each $R^b$ is independently selected from hydrogen, $C_1$-$C_9$ linear or branched hydrocarbyl which may be unsubstituted or substituted and where each J' is independently C or Si;

M is selected from titanium, hafnium or zirconium;

each X is independently a univalent anionic ligand, selected from the group consisting of halogens, $C_{1-10}$ alkyl groups, $C_{7-20}$ aralkyl groups, $C_{6-20}$ aryl groups, $C_{1-20}$ hydrocarbon-substituted amino groups.

* * * * *